(12) United States Patent
Imamura et al.

(10) Patent No.: US 8,126,622 B2
(45) Date of Patent: Feb. 28, 2012

(54) CONTROL DEVICE FOR VEHICULAR POWER TRANSMITTING APPARATUS

(75) Inventors: Tatsuya Imamura, Toyota (JP); Yuji Iwase, Mishima (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 981 days.

(21) Appl. No.: 12/081,820

(22) Filed: Apr. 22, 2008

(65) Prior Publication Data

US 2008/0269996 A1   Oct. 30, 2008

(30) Foreign Application Priority Data

Apr. 25, 2007 (JP) ................... 2007-115709

(51) Int. Cl.
*G06F 7/00* (2006.01)
(52) U.S. Cl. ................. 701/51; 701/53; 701/58
(58) Field of Classification Search .............. 701/51, 701/53, 57, 58, 69; 180/65.2, 65.23
See application file for complete search history.

(56) References Cited

U.S. PATENT DOCUMENTS

| | | | |
|---|---|---|---|
| 4,335,429 A * | 6/1982 | Kawakatsu | 701/102 |
| 5,343,970 A * | 9/1994 | Severinsky | 180/65.25 |
| 5,697,466 A | 12/1997 | Moroto et al. | |
| 6,237,709 B1 | 5/2001 | Chubachi | |
| 6,522,024 B1 | 2/2003 | Takaoka et al. | |
| 7,822,524 B2 | 10/2010 | Tabata et al. | |
| 7,848,858 B2 | 12/2010 | Tabata et al. | |
| 2005/0115751 A1 | 6/2005 | Yamaguchi et al. | |
| 2008/0190676 A1 * | 8/2008 | Imamura et al. | 180/65.2 |
| 2009/0069965 A1 | 3/2009 | Tabata et al. | |
| 2009/0075774 A1 | 3/2009 | Tabata et al. | |

FOREIGN PATENT DOCUMENTS

| | | |
|---|---|---|
| DE | 10 2005 008 156 A1 | 9/2006 |
| EP | 1 143 134 A1 | 10/2001 |
| EP | 1 669 578 A1 | 6/2006 |
| JP | A 5-079556 | 3/1993 |
| JP | A 2005-240917 | 9/2005 |
| JP | A-2005-264762 | 9/2005 |
| JP | A 2005-343458 | 12/2005 |
| JP | A-2006-200508 | 8/2006 |

OTHER PUBLICATIONS

Office Action issued in JP 2007-115709, mailed Jun. 15, 2010. (with English-language translation).

* cited by examiner

*Primary Examiner* — Kevin Hurley
*Assistant Examiner* — Marc Scharich
(74) *Attorney, Agent, or Firm* — Oliff & Berridge, PLC

(57) ABSTRACT

A control device is disclosed which can obtain increased fuel economy performance depending on a kind of fuel in a vehicle having an internal combustion engine and an electric motor when the kind of fuel supplied to the internal combustion engine is altered. A determining vehicle speed (V1) and determining output torque (T1), representing a boundary value with which a step-variable control region and a continuously variable control region of a shifting mechanism (10) are demarcated, are altered such that the higher the mixing ratio of ethanol, the lower will be the determining vehicle speed (V1) and determining output torque (T1). Therefore, the determination is made whether to operate a first electric motor (M1) depending on the mixing ratio of ethanol, making it possible to obtain increased fuel economy performance in line with the mixing ratio of ethanol.

23 Claims, 13 Drawing Sheets

| | C0 | C1 | C2 | B0 | B1 | B2 | B3 | SHIFTING RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | | | | | | | | | |

○ ENGAGED
◎ ENGAGED UPON STEP-VARIABLE
RELEASED UPON CONTINUOUSLY-VARIABLE

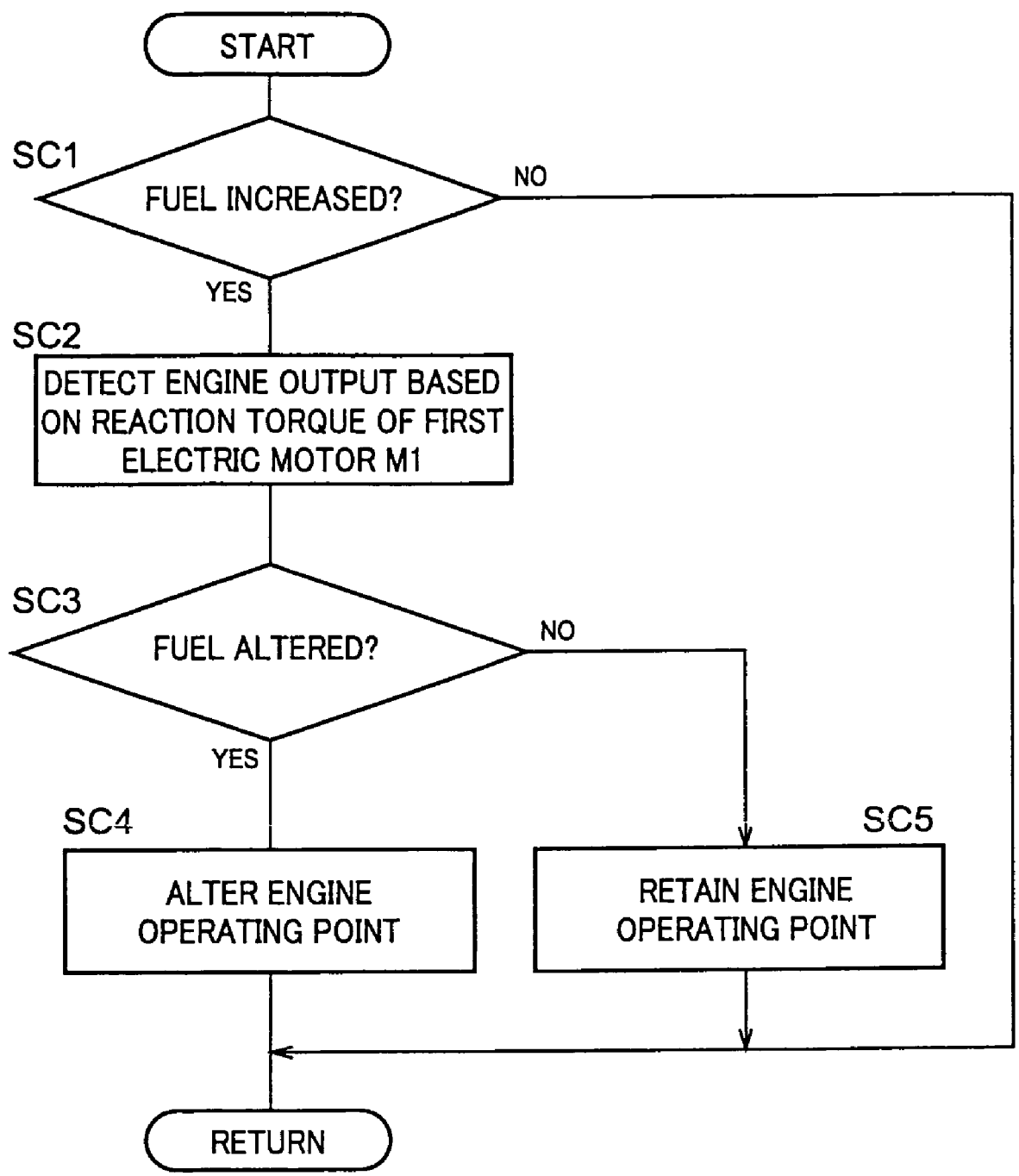

CONTROL DEVICE FOR VEHICULAR POWER TRANSMITTING APPARATUS

TECHNICAL FIELD

The present invention relates to a control device for vehicular power transmitting apparatus. More particularly, this invention relates to a technology of obtaining increased fuel economy performance in a vehicle having an internal combustion engine and an electric motor when a kind of fuel supplied to the internal combustion engine is altered.

BACKGROUND ART

One type of internal combustion engines includes a variable compression internal combustion engine in which a compression ratio can be altered. There has heretofore been known a control device that can alter the compression ratio depending on a kind of fuel such as hydrogen or gasoline supplied to the variable compression internal combustion engine. For instance, Patent Publication 1 (Japanese Patent Application Publication No. 2006-200508) discloses such a control device for controlling the internal combustion engine. Besides, there has been known a technology disclosed in Patent Publication 2 (Japanese Patent Application Publication No. 2005-264762).

With the control device for controlling the internal combustion engine disclosed in Patent Publication 1, the internal combustion engine can have favorable engine performance depending on the kind of fuel. However, there is still room for a power transmitting apparatus, forming part of a power transmitting path from the internal combustion engine to drive wheels, to be optimized depending on the kind of fuel. An entire vehicle, including such a power transmitting apparatus with improved fuel consumption, has been unknown.

SUMMARY OF THE INVENTION

The present invention has been completed with the above view in mind and has an object to provide a control device for vehicular power transmitting apparatus of a vehicle having an internal combustion engine and an electric motor for obtaining increased fuel economy performance depending on a kind of altered fuel when the kind of fuel supplied to the internal combustion engine is altered.

For achieving the above object, in a first aspect of the present invention related to the control device for a vehicular power transmitting apparatus, the vehicular power transmitting apparatus comprises (i) an electrically controlled differential portion including a differential mechanism, composed of a plurality of rotary elements, whose differential state is controlled upon controlling an operating state of a differential-action controlling electric motor connected to one of the plurality of rotary elements in power transmissive state, and (ii) a differential-state switching device operative to selectively switch the differential mechanism into a non-differential state for disenabling a rotation of a certain rotary element among the plurality of rotary elements or causing a whole of the plurality of rotary elements to move in a unitary rotation and a differential state for permitting the plurality of rotary elements to rotate relative to each other to initiate a differential action.

The control device is operative to alter a differential-mechanism switching condition for determining whether to switch the differential mechanism to either the non-differential state or the differential state depending on a kind of fuel used in an internal combustion engine connected to the vehicular power transmitting apparatus in power transmissive state.

In a second aspect of the present invention, the vehicular power transmitting apparatus comprises more than one running-drive motor connected to or connectable to drive wheels in power transmissive state and is operative to allow a running state of a vehicle to be selectively switched into a motor-drive mode, in which only the running-drive motor is used as a drive-force source to cause a vehicle to run with an internal combustion engine placed in a halted state, and a normal running mode in which the vehicle is caused to run with the internal combustion engine placed in an operating state.

The control device is operative to alter a running-state switching condition for determining whether to switch the running state of the vehicle to the motor-drive mode or the normal running mode depending on a kind of fuel used in the internal combustion engine.

In a third aspect of the present invention, the differential-mechanism switching condition or the running-state switching condition is established for each of the kind of fuel so as to prevent component elements of the vehicle from reaching high-speed rotations beyond given rotation speeds.

In a fourth aspect of the present invention, the vehicular power transmitting apparatus comprises an electrically controlled differential portion including a differential mechanism, composed of a plurality of rotary elements, whose differential state is controlled with the control device controlling an operating state of a differential-action controlling electric motor connected to one of the plurality of rotary elements among the plurality of rotary elements in power transmissive state.

In a fifth aspect of the present invention, the control device allows internal-combustion engine output torque, output from the internal combustion engine, to be detected based on reactive torque of the differential-action controlling electric motor acting against the internal-combustion engine output torque for discriminating the kind of fuel based on the internal-combustion engine output torque.

In a sixth aspect of the present invention, the control device discriminates the kind of fuel when the fuel in the fuel tank mounted on the vehicle increases.

In a seventh aspect of the present invention, the control device discriminates the kind of fuel when detecting a release of a lid for closing a fueling port of the fuel tank mounted on the vehicle.

In a eighth aspect of the present invention, the vehicular power transmitting apparatus comprises a shifting portion forming part of a power transmitting path extending from the internal combustion engine to the drive wheels.

In a ninth aspect of the present invention, the shifting portion functions as an automatic transmission that automatically varies a speed ratio.

In a tenth aspect of the present invention, the shifting portion comprises a step-variable transmission.

In an eleventh aspect of the present invention, the electrically controlled differential portion comprises more than two electric motors and a planetary gear unit.

In a twelfth aspect of the present invention, the electrically controlled differential portion operates as a continuously variable transmission with controlling an operating state of the differential-action controlling electric motor.

In a thirteenth aspect of the present invention, the control device includes fuel-alteration determining means for determining alteration of the fuel, fuel-kind determining means for determining kind of the fuel, and differential-mechanism switching-condition altering means for altering switching-condition of the differential-mechanism.

In a fourteenth aspect of the present invention, the fuel-alteration determining means determines alteration of the fuel depending on torque of the internal combustion and an accelerator opening.

In a fifteenth aspect of the present invention, the fuel-kind determining means determines a mixing ratio of a special component in the fuel, depending on deviated amount of relation between the torque of the internal combustion and the accelerator opening accelerator opening, from the baseline characteristic In a sixteenth aspect of the present invention, the differential-mechanism switching-condition altering means alters switching-condition of the differential-mechanism depending on vehicle speed and output torque determined based on the mixing ratio of the special component in the fuel.

In a seventeenth aspect of the present invention, the control device includes fuel-alteration determining means for determining alteration of the fuel, fuel-kind determining means for determining kind of the fuel, and running-state switching-condition altering means for altering switching condition of running-state.

In a eighteenth aspect of the present invention, the running-state switching-condition altering means alters vehicle speed and/or output torque depending on amount of the specific component in the fuel.

Hereunder, various advantageous effects of the present invention will be described below. With varying the kind of supplied fuel, the internal combustion engine has optimum fuel economy performance realized under conditions and output characteristics that are varied. With the first aspect of the present invention, the control device alters the differential-mechanism switching condition for determining whether to switch the differential mechanism to either the non-differential state or the differential state depending on the kind of fuel used in operating the internal combustion engine. This allows the determination to be made whether to operate the differential-portion controlling electric motor depending on the kind of fuel, thereby making it possible to obtain increased fuel economy performance depending on the kind of fuel.

With the second aspect of the present invention, the control device alters the running-state switching condition for determining whether to switch the running state of the vehicle to the motor-drive mode or the normal running mode depending on the fuel kind used in operating the internal combustion engine. This allows the determination to be made whether to operate the internal combustion engine depending on the fuel kind, making it possible to obtain increased fuel economy performance depending on the fuel kind.

With the third aspect of the present invention, the control device establishes the differential-mechanism switching condition or the running-state switching condition for each of the fuel kind so as to prevent component elements of the vehicle from reaching high-speed rotations beyond given rotation speeds. This prevents the component elements of the vehicle from reaching the high-speed rotations beyond the given rotation speeds with no fear of degradation occurring in these component elements.

With the fourth aspect of the present invention, the vehicular power transmitting apparatus comprises the electrically controlled differential portion. The electrically controlled differential portion includes the differential mechanism composed of the plurality of rotary elements. Controlling the operating state of the differential-action controlling electric motor, connected to one of the plurality of rotary elements among the plurality of rotary elements in power transmissive state, allows the differential state of the differential mechanism to be controlled. The control device controls the operating state of the differential-action controlling electric motor for controlling the differential state of the differential mechanism incorporated in the electrically controlled differential portion, making it possible to drive the internal combustion engine at a rotation speed enabling the realization of increased fuel economy performance.

With the fifth aspect of the present invention, the control device allows the internal-combustion engine output torque, output from the internal combustion engine, to be detected based on the reactive torque of the differential-action controlling electric motor acting against the internal-combustion engine output torque for discriminating the fuel kind based on the internal-combustion engine output torque. This allows the fuel kind to be easily discriminated with detecting the reactive torque of the differential-action controlling electric motor.

With the sixth aspect of the present invention, the control device discriminates the fuel kind when fuel in the fuel tank mounted on the vehicle increases. Thus, the discrimination is not conducted at all times but conducted depending on needs, thereby enabling a reduction in load of the control device.

With the seventh aspect of the present invention, the control device discriminates the fuel kind upon detecting the release of the lid for closing the fueling port of the fuel tank mounted on the vehicle. Thus, the discrimination is not conducted at all times but conducted depending on needs, thereby enabling a reduction in load of the control device.

With the eighth aspect of the present invention, the vehicular power transmitting apparatus comprises the shifting portion forming part of the power transmitting path extending from the internal combustion engine to the drive wheels. This enables the vehicular power transmitting apparatus to obtain the speed ratio in a greater variable range than that of the speed ratio obtained with a vehicular power transmitting apparatus provided with no shifting portion, making it possible to obtain increased fuel economy performance.

With the ninth aspect of the present invention, the shifting portion functions as the automatic transmission that can automatically vary the speed ratio. This enables the vehicular power transmitting apparatus to automatically vary the sped ratio, enabling a reduction in load of a driver.

With the tenth aspect of the present invention, the shifting portion comprises the step-variable transmission. This enables the shifting portion to have the speed ratio in an increased variable range, thereby obtaining increased fuel economy performance.

With the eleventh aspect of the present invention, the electrically controlled differential portion comprises the more than two electric motors and the planetary gear unit. Therefore, the electrically controlled differential portion can be configured in a structure that can infinitely vary torque output from the electrically controlled differential portion upon utilizing the differential action of the planetary gear set.

With the twelfth aspect of the present invention, the electrically controlled differential portion operates as the continuously variable transmission upon controlling the operating state of the differential-action controlling electric motor. This makes it possible to smoothly vary drive torque output from the electrically controlled differential portion. In addition, the electrically controlled differential portion has not only a function to continuously vary the speed ratio to be operative as the electrically controlled continuously variable transmission, but a function to vary the speed ratio step-by-step to be operative as the step-variable transmission.

BRIEF DESCRIPTION OF THE DRAWINGS

FIG. 15A shows a case wherein only gasoline is used as fuel and FIG. 15B shows another case in which a given amount of ethanol is mixed to gasoline.

FIG. 16 is a flowchart, illustrating a basic sequence of major control operations to be executed with the electronic control device shown in FIG. 4, i.e., a basic sequence of control operations for improving fuel consumption when ethanol is mixed to fuel, which represents a third embodiment different from the embodiment of FIG. 11.

BEST MODE FOR CARRYING OUT THE INVENTION

Now, various embodiments of the present invention will be described below in detail with reference to accompanying drawings.

Embodiment 1

Figures 1, 2:
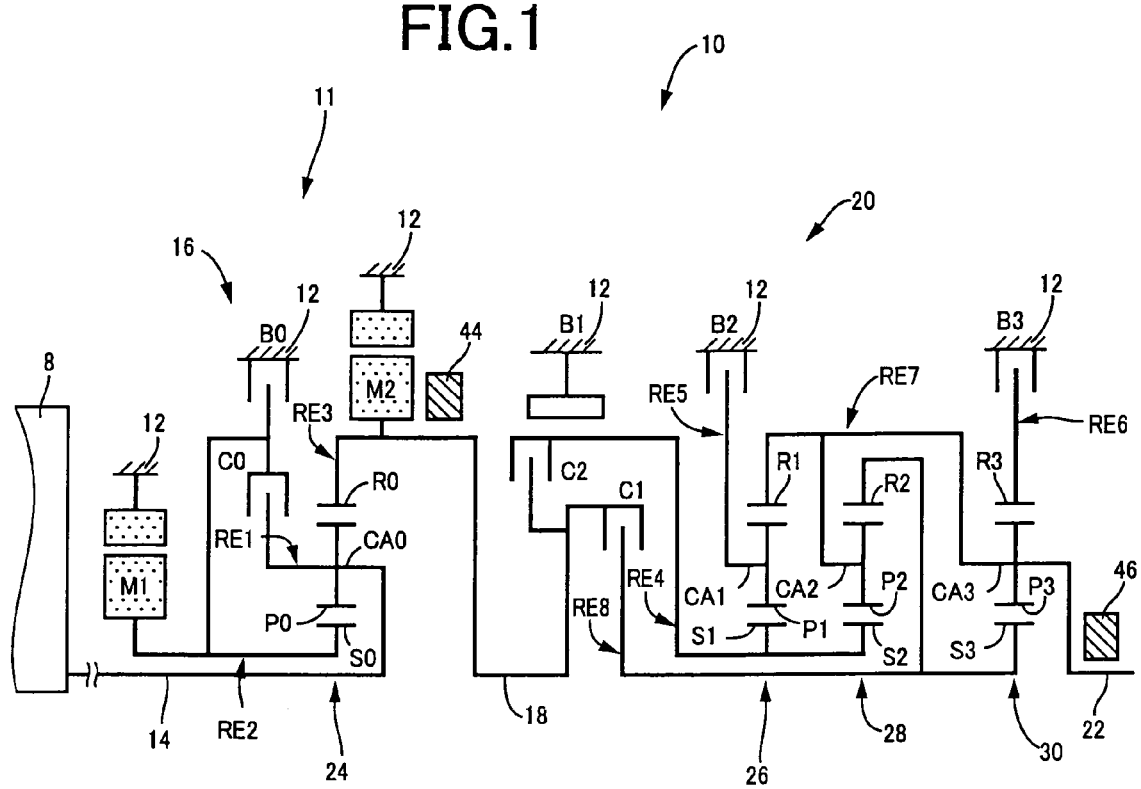
FIG. 1 is a skeleton view explaining a structure of a hybrid vehicle power transmitting apparatus to which a control device of the present invention is applied.
FIG. 2 is an engagement operation table illustrating the relationship between a shifting operation, in which the hybrid vehicle power transmitting apparatus, shown in FIG. 1, is placed in a continuously variable or step-variable shifting state, and the operation of a hydraulic-type frictional engaging device in combination.

FIG. 1 is a skeleton view illustrating a shifting mechanism 10, forming part of a power transmitting apparatus for a hybrid vehicle, to which a control device of one embodiment according to the present invention is applied. As shown in FIG. 1, the shifting mechanism 10 includes an input shaft 14 serving as an input rotary member, and a differential portion 11 directly connected to the input shaft 14 or indirectly connected thereto through a pulsation absorbing damper (vibration damping device) not shown. It also includes an automatic shifting portion 20 connected via a power transmitting member (transmission shaft) 18 in series through a power transmitting path between the differential mechanism 11 and drive wheels 38 (see FIG. 6) to serve as a step-variable type transmission, and an output shaft 22 connected to the automatic shifting portion 20 as an output rotary member. All of these are disposed in a transmission casing 12 (hereinafter briefly referred to as a "casing 12") serving as a non-rotary member connectedly mounted on a vehicle body.

Figure 6:
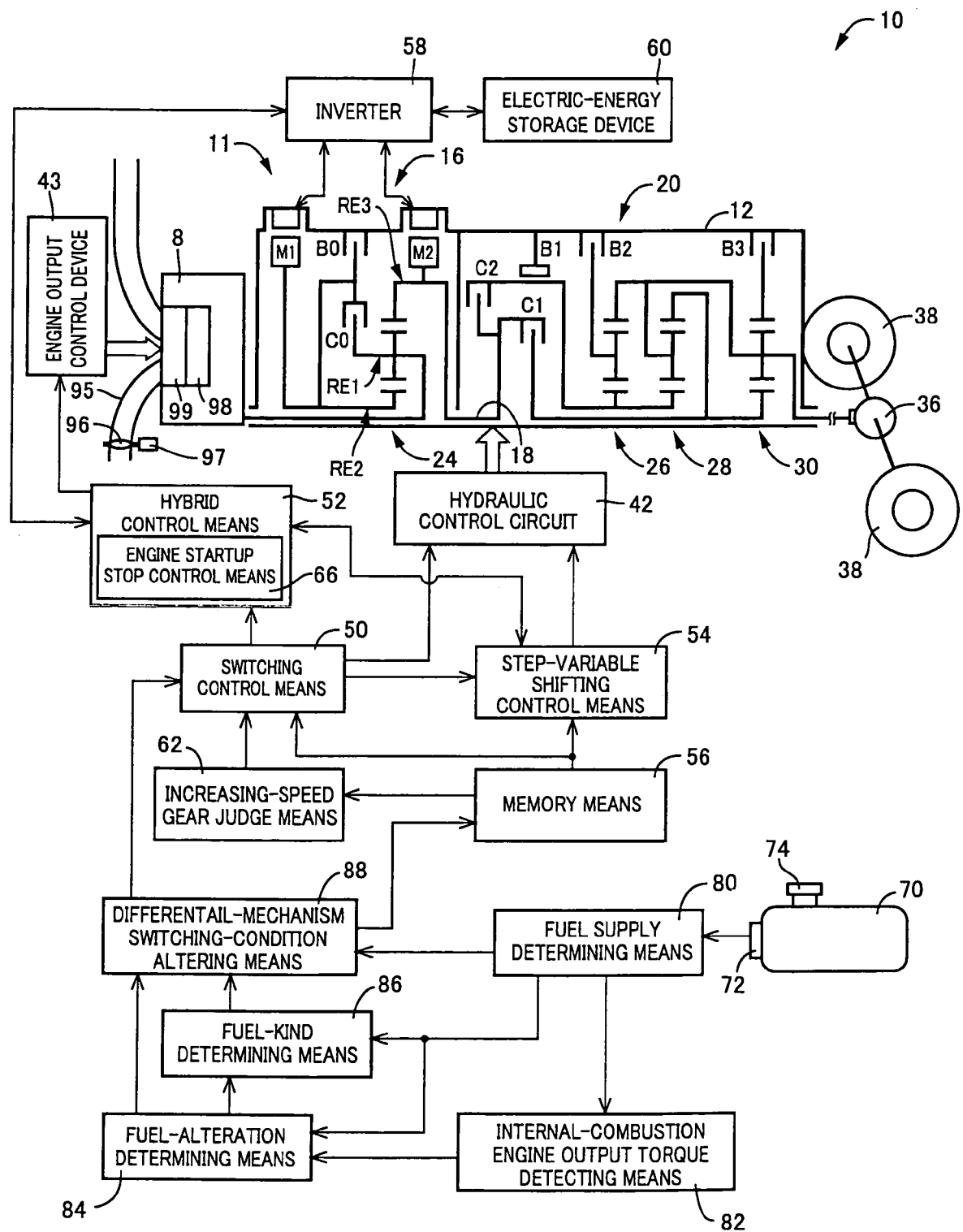
FIG. 6 is a functional block diagram illustrating a major control function to be executed by the electronic control device related to a first embodiment shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles.

With the shifting mechanism 10 of the present embodiment, the engine 8 and the differential portion 11 are connected to each other in a direct connection. As used herein, the term "direct connection" may refer to a connection, established without intervening any fluid-type transmitting device such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 can be said to be an electrically controlled differential portion in respect of an operation in which a differential state is altered using a first electric motor. The differential portion 11 includes a first electric motor M1, a power distributing mechanism 16 serving as a mechanical mechanism like a differential mechanism through which an output of the engine 8, inputted to the input shaft 14, is transferred to the first electric motor M1 and the power transmitting member 18, and a second electric motor M2 unitarily rotatable with the power transmitting member 18.

Further, the second electric motor M2 may be disposed at any portion of the power transmitting path extending from the power transmitting member 18 to the drive wheels 38. Moreover, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism of the present invention, mainly includes a differential-portion planetary gear unit 24 of a single pinion type having a given gear ratio $\rho 0$ of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio $\rho 0$ is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio $\gamma 0$ (rotation speed of the driving device input shaft 14/rotation speed of the power transmitting member 18) continuously varying in a value ranging from a minimum value $\gamma 0$ min to a maximum value $\gamma 0$ max.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the differential-portion sun gear S0 and the differential-portion carrier CA0 to be unitarily coupled to each other, the power distributing mechanism 16 is placed in a locked state. In the locked state, the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio $\gamma 0$ connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state.

Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio $\gamma 0$ connected to a value smaller than "1", i.e., for example, about 0.7.

With the present embodiment, the switching clutch C0 and the switching brake B0 selectively place the shifting state of differential portion 11 (power distributing mechanism 16) in the differential state, i.e., the unlocked state, and the non-differential state, i.e., the locked state. That is, the switching clutch C0 and the switching brake B0 serves as a differential state switching device that selectively switches the differential portion 11 (power distributing mechanism 16) in one of the continuously variable shifting state and the fixed shifting state.

The continuously variable shifting state is operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable. In the fixed shifting state, the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R0 meshing with the first sun gear S1 via the first planetary gears P1, having a gear ratio $\rho1$ of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having for example a gear ratio $\rho2$ of about "0.425".

The third planetary gear unit 30 includes a third sun gear S3, third planetary gears P3, a third carrier CA4 supporting the third planetary gears P3 to be rotatable about its axis and about the axis of the third sun gear S3, and the third ring gear R3 meshing with the third sun gear S3 through the third planetary gears P3, having a gear ratio $\rho3$ of about "0.421". With the first sun gear S1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios $\rho1$, $\rho2$ and $\rho3$ are represented by ZS1/ZR1, ZS2/ZR2, and ZS3/ZR3, respectively.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first differential-portion ring gear R0, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state.

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation Table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neutral position with a speed ratios $\gamma$ (input-shaft rotation speed $N_{IN}$/output-shaft rotation speed $N_{OUT}$) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level.

With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state.

In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position.

Engaging the switching clutch C0, the first clutch C1 and the first brake B1 results in the 3rd-speed gear position with the speed ratio γ3 of, for instance, about "1.424", which is lower than that of the 2nd-speed gear position. Engaging the switching clutch C0, the first clutch C1 and the second clutch C2 results in the 4th-speed gear position with the speed ratio γ4 of, for instance, about "1.000", which is lower than that of the 3rd-speed gear position.

With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st- and 2nd-speed gear positions. For the neutral "N" state to be established, for instance, all the clutches and the brakes C0, C1, C2, B0, B1, B2 and B3 are disengaged.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) γT.

Figure 3:
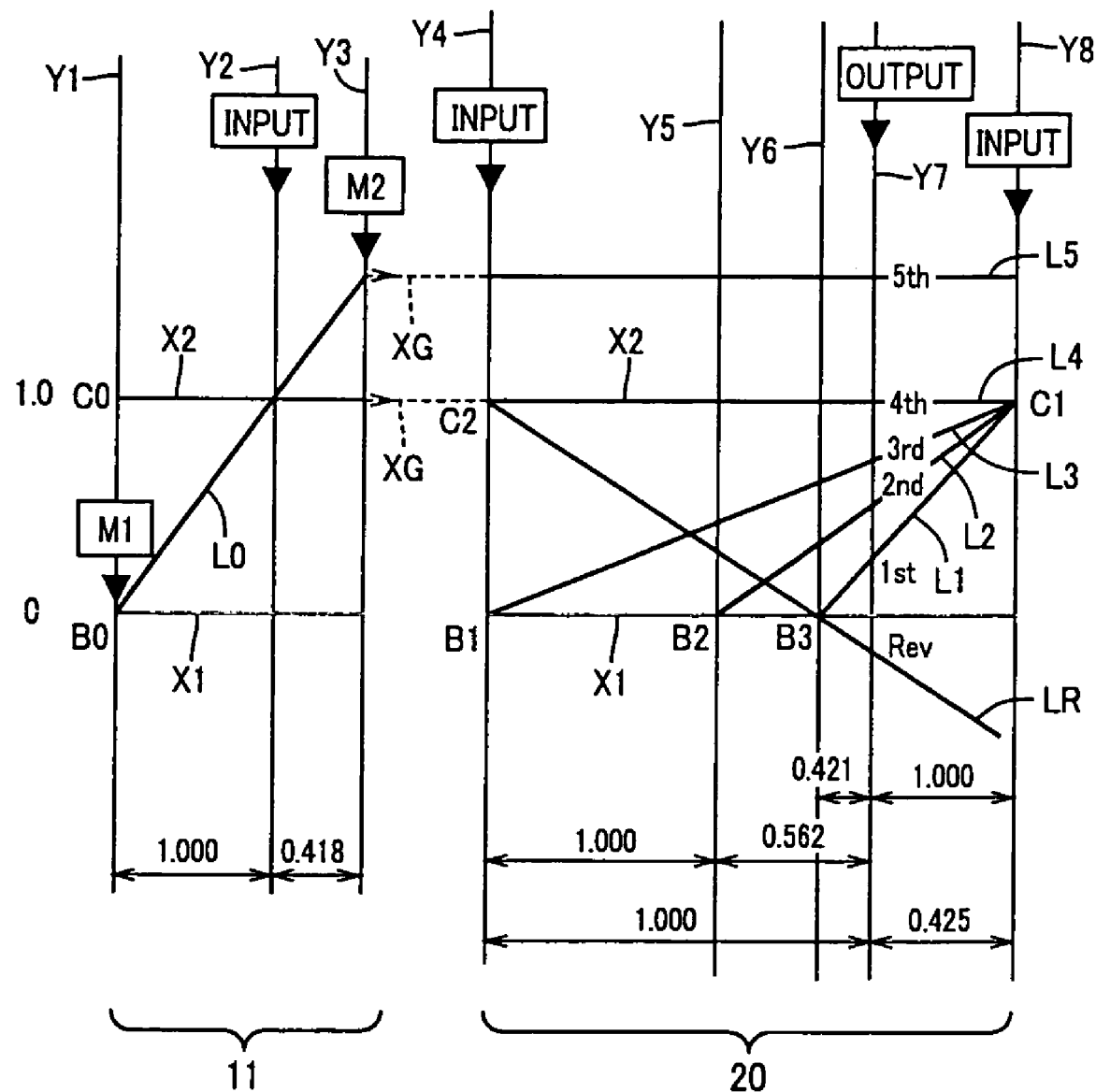
FIG. 3 is a collinear chart illustrating the relative rotation speed of rotary elements in each of different gear positions when the hybrid vehicle power transmitting apparatus, shown in FIG. 1, is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios ρ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left, three vertical lines Y1, Y2 and Y3, corresponding to the three elements forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio ρ0 of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier corresponding to a fifth rotary element (fifth element) RE5, the third ring gear R3 corresponding to a sixth rotary element (sixth element) RE6, the first differential-portion ring gear R0 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios ρ1, ρ2 and ρ3 of the first to third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio ρ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "ρ". For each of the first to third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio ρ.

Expressing the structure using the collinear chart shown in FIG. 3, the shifting mechanism 10 of the present embodiment takes the form of a structure including the power distributing mechanism 16 (continuously variable shifting portion 11). With the power distributing mechanism 16, the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$.

In contrast, with the switching brake B0 being engaged to halt the rotation of the differential-portion sun gear S0, the power distributing mechanism 16 is brought into the non-differential state to function as the speed increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 11 to the eighth rotary element RE8 at a higher rotation speed than the engine rotation speed $N_E$. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
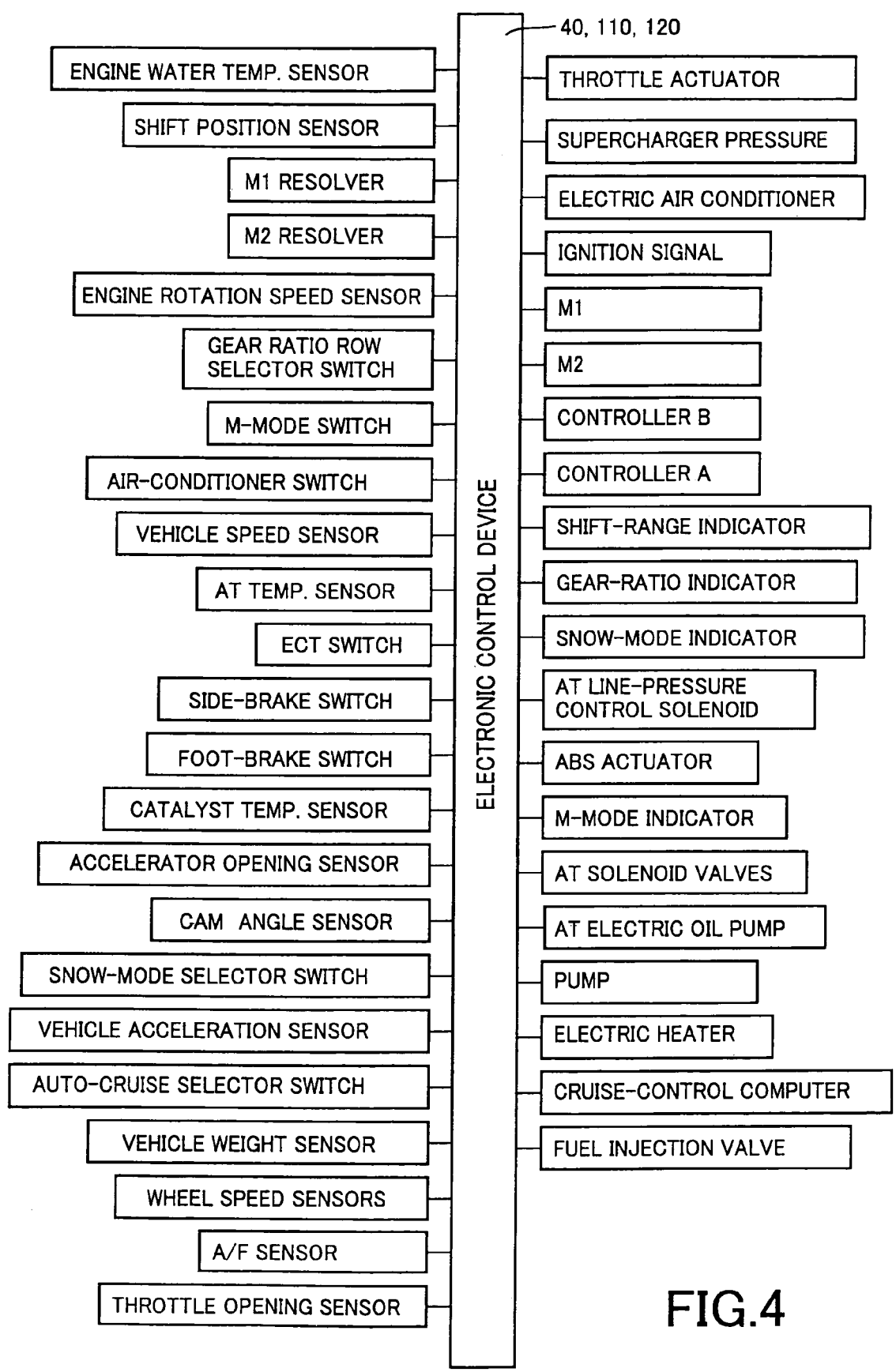
FIG. 4 is a view illustrating input and output signals to be input to or output from an electronic control device incorporated in the hybrid vehicle power transmitting apparatus shown in FIG. 1.

FIG. 4 exemplarily shows various input signals applied to an electronic control device 40, serving as a control device for controlling the shifting mechanism 10 forming part of the hybrid vehicle power transmitting apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the ROM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$, a signal indicative of a selected shift position $P_{SH}$, a signal indicative of a rotation speed $N_{M1}$ (hereinafter, referred to as a "first-motor rotation speed $N_{M1}$") of the first electric motor M1 detected by a rotation speed sensor 44 (refer to FIG. 1) such as a resolver, a signal indicative of a rotation speed $N_{M2}$ (hereinafter, referred to as a "second-motor rotation speed $N_{M2}$") of the second electric motor M2 detected by a rotation speed sensor 44 (refer to FIG. 1), a signal indicative of the engine rotation speed $N_E$ representing the rotation speed of the engine 8, a signal indicative of a set value of gear ratio row, a signal commanding an "M" mode (manually shift drive mode), an air-conditioning signal indicative of the operation of an air conditioner, and a signal indicative of the vehicle speed V corresponding to the rotation speed $N_{OUT}$ of the output shaft 22 detected by a vehicle speed sensor 46 (refer to FIG. 1), etc.

Besides the input signals described above, the electronic control device 40 is further applied with other various input signals. These input signals include, a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, a signal indicative of an air-fuel ratio A/F of the engine 8, and a signal indicative of a throttle valve opening $\theta_{TH}$, etc. The rotation speed sensor 44 and the vehicle speed sensor 46 can detect, in addition to the rotation speed, the rotation direction. When the automatic shifting portion 20 is placed in the neutral position during the vehicle running, the vehicle speed sensor 46 detects the forwarding direction of the vehicle.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating a hydraulic pressure pump serving as a hydraulic pressure source of the hydraulically operated control circuit 42, a signal for driving an electric heater, and signals applied to a cruise-control computer, etc.

Figure 5:
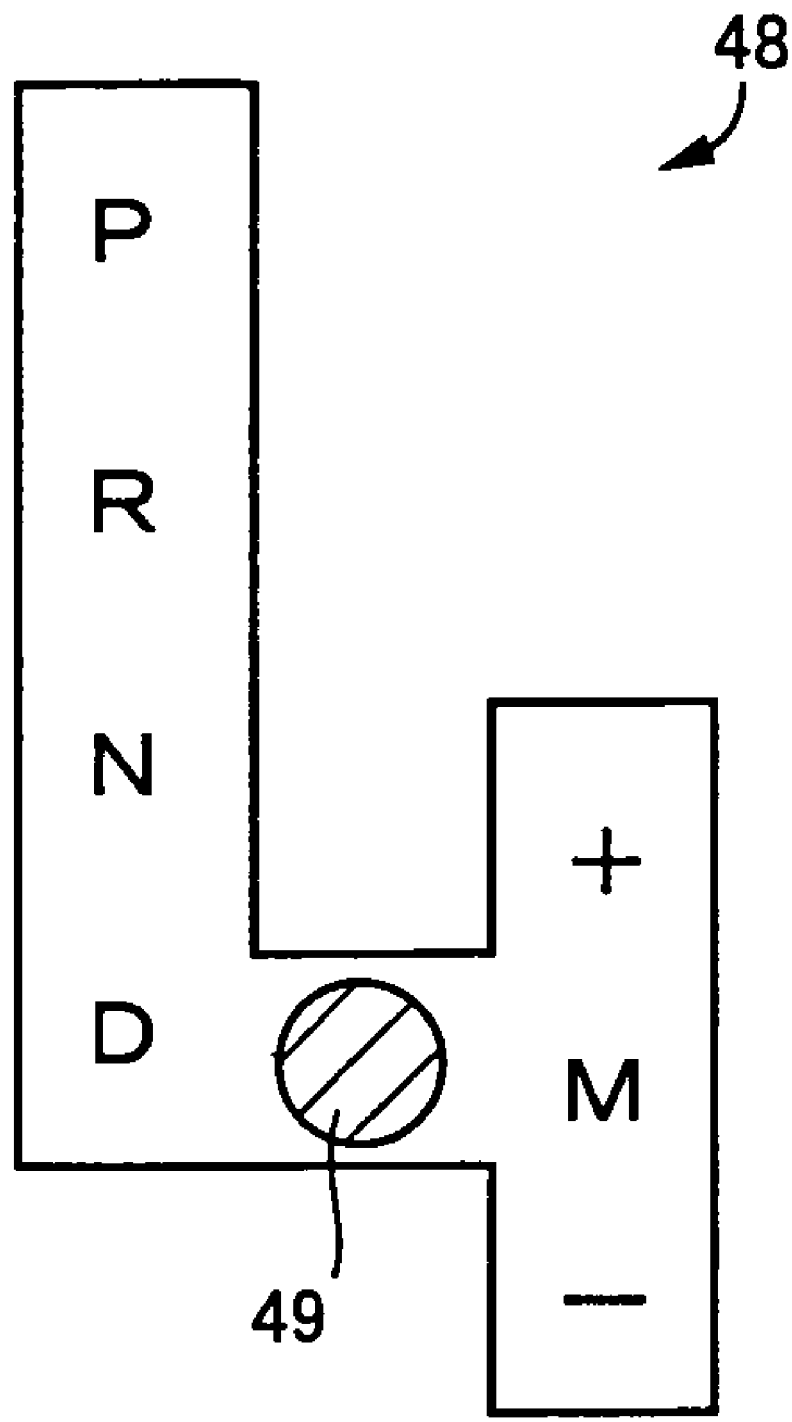
FIG. 5 is a view showing one sample of a shift operating device provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio $\gamma T$ that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions $P_{SH}$, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions $P_{SH}$ covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff i.e. interrupted state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for instance, the engagement operation table of FIG. 2. With such shifting positions selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state.

Figure 7:
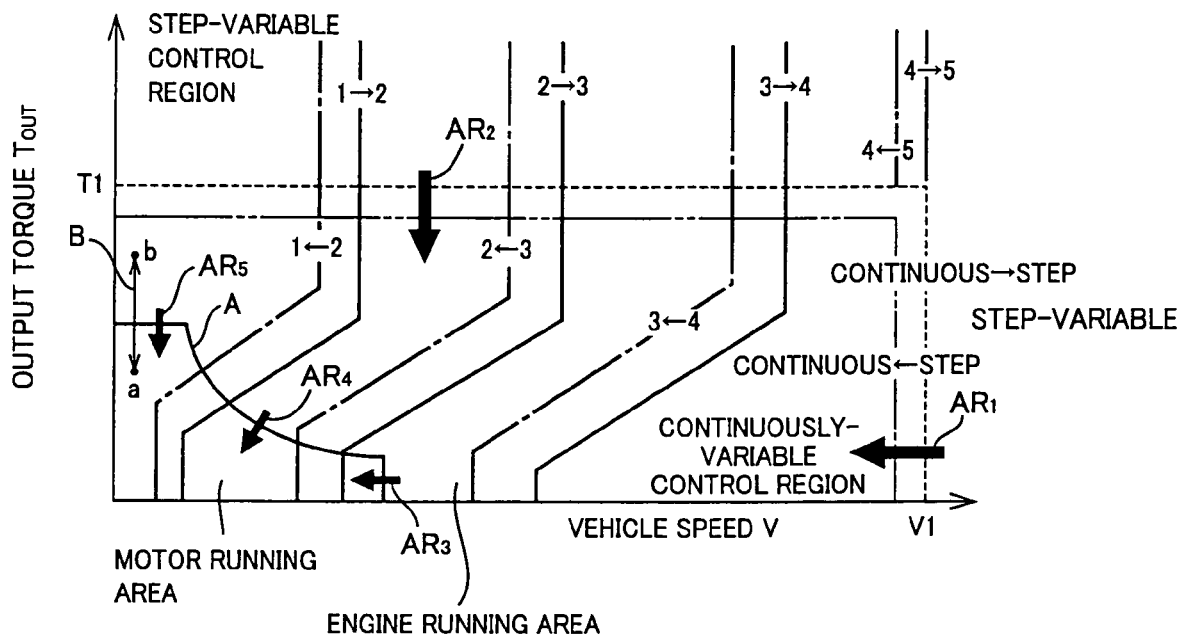
FIG. 7 is a view representing one example of a preliminarily stored shifting diagram, plotted on a two-dimensional coordinate in terms of parameters including a vehicle speed and output torque, based on which the operation is executed whether to a shifting is executed in an automatic shifting portion; one example of preliminarily stored diagram, based on which a shifting state of the shifting mechanism is switched; and one example of a preliminarily stored drive-force source switching diagram having a boundary line between an engine drive region and a motor drive region based on which an engine drive mode and a motor drive mode is switched.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7.

That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulically operated frictional engaging devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio γ0 of the differential portion 11 placed in the electrically controlled continuously variable transmission.

For instance, during the running of the vehicle at a current vehicle speed, the hybrid control means 52 calculates a target (demanded) output of the vehicle by referring to the displacement value Acc of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed $N_E$ and engine torque $T_E$ such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed $N_E$, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationships) of the engine 8 preliminarily determined on an experimental basis such that, during the running of the vehicle under the continuously variable shifting state, the vehicle has drivability and fuel economy performance in compatibility on a two-dimensional coordinate with parameters including, for instance, the engine rotation speed $N_E$ and output torque (engine torque) $T_E$ of the engine 8.

In order to cause the engine 8 to operate on such an optimum fuel economy curve, a target value on the total speed ratio γT of the shifting mechanism 10 is determined so as to obtain engine torque $T_E$ and the engine rotation speed $N_E$ for the demanded engine output to be generated so as to satisfy, for instance, the target output (total target output and demanded drive force). To achieve such a target value, the hybrid control means 52 controls the speed ratio γ0 of the differential portion 11, while controlling the total speed ratio γT within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque $T_E$, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed $N_{M1}$ at a negative rotation speed, i.e., at an idling speed to maintain the engine rotation speed $N_E$ at a zeroed or nearly zeroed level, thereby minimizing a drag of the engine 8, remained under a halted state, for providing improved fuel economy.

The hybrid control means 52 includes engine-startup stop controlling means 66 that switches an operating state of the engine 8 between a drive state and a stop state to select one of the engine drive mode and the motor drive mode. As used herein, the term "switches" refers to an operation in which the engine 8 is started up or stopped in operation. With the hybrid control means 52 executed the operation based on the vehicle condition by referring to, for instance, the drive-force source switching diagram shown in FIG. 7 to determine that the motor drive mode and the engine drive mode need to be switched, the engine-startup stop controlling means 66 executes the operation to start up or stop the engine 8.

If the accelerator pedal is depressed in operation to cause an increase in demanded engine output torque $T_{OUT}$, the vehicle condition varies from the motor drive region to the engine drive region as shown by a transition in points "a"→"b" on a solid line B in FIG. 7. When this takes place, the engine-startup stop controlling means 66 turns on the first electric motor M1 to raise the first-motor rotation speed $N_{M1}$. That is, the first electric motor M1 is rendered operative to function as a starter. This allows the engine 8 to start up with an increase in the engine rotation speed $N_E$. During such operation, the engine-startup stop controlling means 66 causes the ignition device 99 to initiate an ignition at a given engine rotation speed $N_E'$, i.e., for instance, at an engine rotation speed $N_E$ enabling an autonomous rotation, after which the hybrid control means 52 switches the motor drive mode to the engine drive mode.

During such operation, the engine-startup stop controlling means 66 may cause the first-motor rotation speed $N_{M1}$ to immediately raise for increasing the engine rotation speed $N_E$ up to the given engine rotation speed $N_E'$. This can immediately avoid the occurrence of a resonating region from an engine rotating speed region remaining below an idling rotation speed $N_{EIDLE}$ that is well known, thereby suppressing the possibility of the engine 8 vibrating at startup thereof.

If the accelerator pedal is released with a decrease in demanded engine output torque $T_{OUT}$, the vehicle condition varies from the engine drive region to the motor drive region as shown by another transition in points "b"→"a" on the solid line B in FIG. 7. When this takes place, the engine-startup stop controlling means 66 causes the fuel injection device 98 to interrupt the supply of fuel to the engine 8. That is, a fuel cutoff operation is executed to stop the engine 8. In such a way, the hybrid control means 52 switches the engine drive mode to the motor drive mode. During such an operation, the engine-startup stop controlling means 66 may execute the operation to immediately lower the first-motor rotation speed $N_{M1}$ for immediately lowering the engine rotation speed $N_E$ to a zeroed or nearly zeroed level. This immediately avoids the engine 8 from entering the resonating region, thereby suppressing the possibility of the engine 8 vibrating at startup thereof.

In an alternative, the engine-startup stop controlling means 66 may execute the operation to stop the engine 8 upon executing an operation to lower the first-motor rotation speed $N_{M1}$ to decrease the engine rotation speed $N_E$ on a stage prior to the fuel cutoff operation being executed for effectuating the fuel cutoff operation at the given engine rotation speed $N_E'$.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from the collinear chart shown in FIG. 3, for instance, when raising the engine rotation speed $N_E$, the hybrid control means 52 executes the operation to maintain the second-motor rotation speed $N_{M2}$, bound with the vehicle speed V, at a nearly fixed level while raising the first-motor rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Switching control means 50 switches the engaging and/disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11). That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio γ0, i.e., for instance, the speed ratio γ0 equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio γ0, i.e., for instance, the speed ratio γ0 equal to "1".

Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56.

In this case, the step-variable shifting control means 54 performs the automatic shifting upon executing the operation excepting the operations to engage the switching clutch C0 and the switching brake B0 in the engagement operation table shown in FIG. 2. This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio γT in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent up-shift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque at a high output.

A hysteresis is provided for determining the step-variable control region and the continuously variable control region as indicated by a double dot line in FIG. 7 in contrast to the broken line. That is, FIG. 7 represents a shifting diagram (switching map and relationship), preliminarily stored in terms of the parameters including the vehicle speed V, including the determining vehicle speed V1 and determining output torque T1, and output torque $T_{OUT}$, based on which the switching control means 50 executes the determination on a region as to which of the step-variable control region and the continuously variable control region belongs to the shifting mechanism 10.

The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this casing, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the running of the vehicle to even if the shifting mechanism 10 remains in the continuously variable control region. As used herein, the term "malfunction or functional deterioration in electrical control equipment" refers to a vehicle condition in which functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$ or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the running of the vehicle at the high speed turns out a consequence of deterioration in fuel economy. The determining vehicle speed V1 is determined to a value that can render the shifting mechanism 10 operative in the step-variable shifting state during the vehicle running at the high speed so as to address such an issue. Further, determining torque T1 is determined to a value that prevents reactive torque of the first electric motor M1 from covering a high output region of the engine during the running of the vehicle at a high output. That is, determining torque T1 is determined to such a value depending on, for instance, a characteristic of the first electric motor M1 that is possibly mounted with a reduced maximum output in electric energy for miniaturizing the first electric motor M1.

Figure 8:
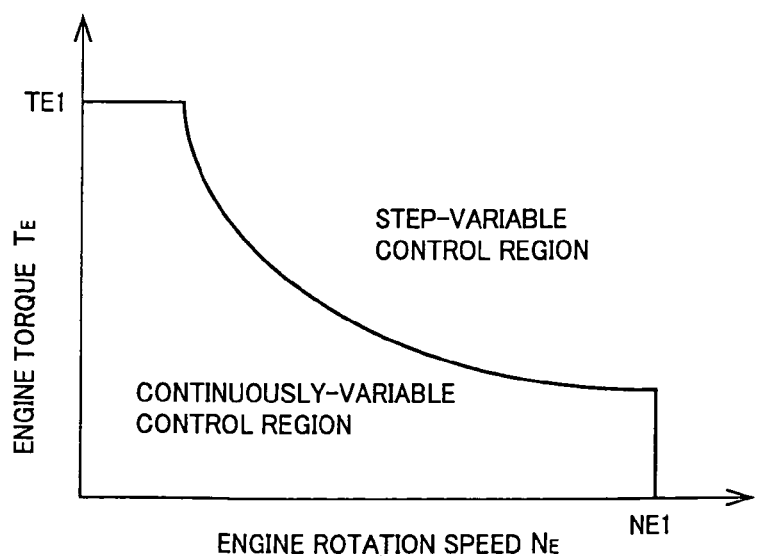
FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 8 in place of the switching diagram shown in FIG. 7. That is, the switching control means 50 may determine whether the vehicle condition, represented with the engine rotation speed $N_E$ and engine torque $T_E$, lies in the step-variable control region or the continuously variable control region.

Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

Figure 9:
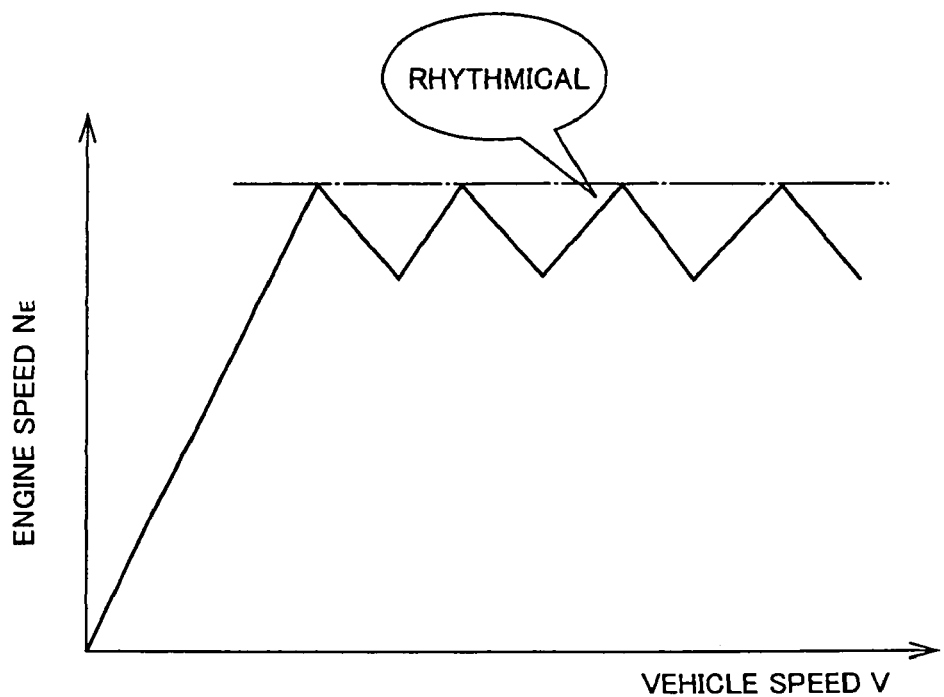
FIG. 9 is a graph showing a fluctuation in an engine rotation speed with an up-shift effectuated in a step-variable transmission.

As indicated by the relationship shown in FIG. 8, similarly, the step-variable control region is set to lie in a high-torque region with engine torque $T_E$ exceeding a predetermined given value TE1, a high-speed rotating region with the engine rotation speed $N_E$ exceeding a predetermined given value NE1, or a high output region where the engine output calculated, based on engine torque $T_E$ and the engine rotation speed $N_E$, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 9, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the running of the vehicle at a low/medium speed and low/medium output, the shifting mechanism 10 is placed in the continuously variable shifting state to ensure the vehicle to have improved fuel economy performance. During the running of the vehicle at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 is caused to act as the electrically controlled continuously variable transmission, providing improved fuel consumption.

During the running of the vehicle on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle power transmitting apparatus including such a component part to be further miniaturized in structure.

According to another viewpoint, further, during the running of the vehicle on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the up-shifting in the step-variable automatic shift running mode as shown, for instance, in FIG. 9.

In such a way, the differential portion 11 (shifting mechanism 10) of the present embodiment can be selectively switched to one of the continuously variable shifting state and the step-variable shifting state (fixed shifting state). The switching control means 50 executes the operation based on the vehicle condition to determine the shifting state to be switched in the differential portion 11, thereby causing the shifting state to be selectively switched to either one of the continuously variable shifting state and the step-variable shifting state. With the first embodiment, the engine startup and stop controlling means 66 operates to start up or stop the engine 8 such that the hybrid control means 52 can execute the operation based on the vehicle condition to switch the engine drive mode and the motor drive mode.

Although the engine 8 is basically supplied with gasoline as fuel, it is likely that ethanol is mixed to gasoline fuel at a certain ratio. In this case, the characteristic of the engine 8 is caused to vary due to ethanol being mixed. Accordingly, for the purpose of improving fuel consumption, a need arises to alter a condition under which the shifting mechanism 10 is switched to the continuously variable shifting state or the step-variable shifting step.

Therefore, when ethanol is mixed to fuel supplied to the engine 8, a control operation is executed to improve fuel consumption of the hybrid vehicle in line with the resulting fuel. Hereunder, such a control operation will be described.

Turning back to FIG. 6, fuel supply determining means 80 determines whether or not the amount of fuel increases in a fuel tank 70 of the hybrid vehicle. This is because if fuel in the fuel tank 70 does not increase, no provability occurs for the mixing ratio of ethanol to be altered with a change in the fuel kind. More particularly, here, the presence or absence of an increase in fuel in the fuel tank 70 is judged in response to a signal from, for instance, a fuel gauge 72 for detecting an oil quantity in the fuel tank 70. Further, the fuel supply determining means 80 may be configured to make the determination, with detecting a fueling port lid 74 for closing a fueling port of the fuel tank 70 being opened for additional supply of fuel, that fuel in the fuel tank 70 increases.

The power transmitting member 18, the first electric motor M1 and the engine 8 are connected to each other via the differential-portion planetary gear unit 24. With the shifting mechanism 10 placed in the continuously variable shifting state during the engine drive mode, therefore, the power transmitting member 18 rotates at a given rotation speed and, hence, the first electric motor M1 outputs reactive torque acting against engine torque $T_E$. With such reactive torque induced, engine torque $T_E$ can be obtained. To this end, internal-combustion engine output torque detecting means 82 detects output torque $T_{M1}$ (hereinafter referred to as "first-motor torque $T_{M1}$") of the first electric motor M1, acting against reactive torque, based on a value of electric current flowing through the first electric motor M1. The electric current value is obtained based on a control variable-applied to the inverter 58.

The internal-combustion engine output torque detecting means 82 calculates engine torque $T_E$ based on first-motor torque $T_{M1}$ and the gear ratio ρ0 or the like. In particular, when engine torque $T_E$ and first-motor torque $T_{M1}$ are not zeroed to remain in a balanced state, i.e., during a steady running state of the vehicle, engine torque $T_E$ can be calculated using a formula (1) expressed below. Also, the formula (1) has a right side marked with a negative sign (−) because first-motor torque $T_{M1}$ is oriented in opposition to engine torque $T_E$.

$$T_E = -T_{M1} \times (1+\rho 0)/\rho 0 \qquad (1)$$

Figure 10:
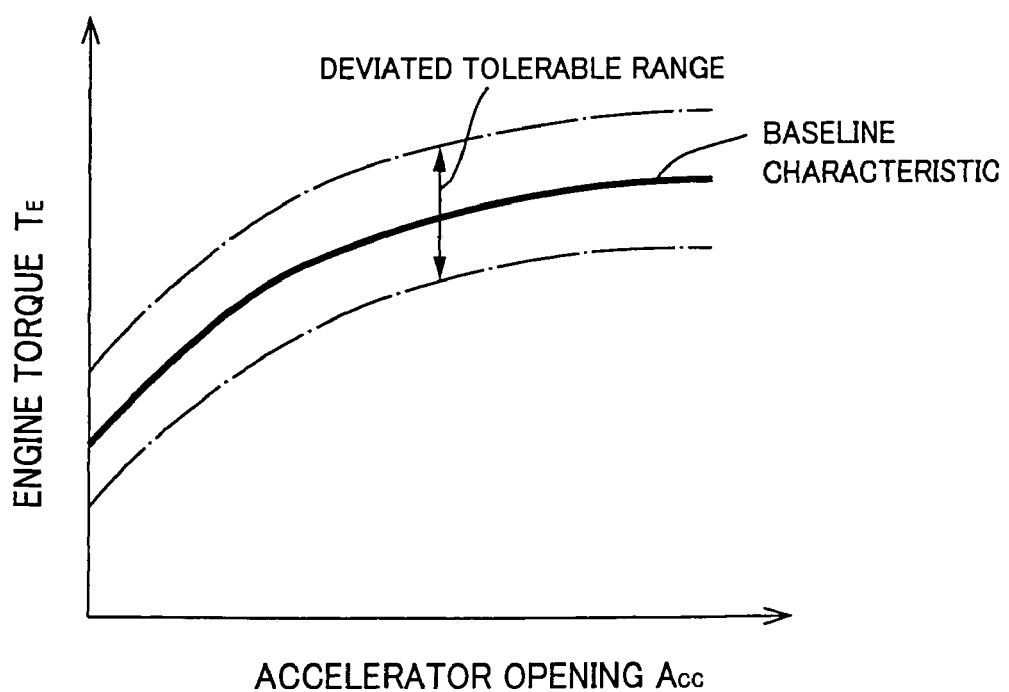
FIG. 10 is a graph showing the relationship between engine torque $T_E$ and an accelerator-opening Acc with gasoline used as fuel to be supplied to the engine shown in FIG. 1.

FIG. 10 is a graph showing the relationship between engine torque $T_E$ and the accelerator-opening Acc when using gasoline as fuel. The relationship between engine torque $T_E$ and the accelerator-opening Acc can vary within a variation tolerable range indicated by single dot lines based on a baseline characteristic described with a thick solid line in FIG. 10. The shifting mechanism 10 is designed on consideration of such a relationship.

When the fuel kind is altered with an attempt of mixing ethanol to gasoline supplied to the engine 8, the relationship between engine torque $T_E$ and the accelerator-opening Acc is deviated form the baseline characteristic set forth above. Fuel-alteration determining means 84 preliminarily stores the baseline characteristic, shown in FIG. 10, as a characteristic to be used when, for instance, only gasoline is employed as fuel.

When the relationship between engine torque $T_E$ and the accelerator-opening Acc, calculated by the internal-combustion engine output torque detecting means 82, runs off to be deviated from a given tolerable range defined in consideration of a variation in properties of gasoline with respect to the baseline characteristic mentioned above, the fuel-alteration determining means 84 makes judgment that ethanol is mixed to fuel, making a positive determination that the fuel kind is altered.

If ethanol is mixed to gasoline at a given mixing ratio, for instance, the resulting fuel tends to have an increased octane rating. With an increased octane rating, the engine 8 is less liable to suffer knocking and controlled so as to accelerate spark timing. With the accelerator-opening Acc held constant, engine torque $T_E$ is deviated in a direction to significantly increase.

When the fuel-alteration determining means 84 makes a positive determination that the fuel kind is altered, fuel-kind determining means 86 estimates the mixing ratio of ethanol based on the relationship between engine torque $T_E$ and the accelerator-opening Acc, calculated by the internal-combustion-engine output torque detecting means 82, which is deviated from the baseline characteristic mentioned above. If, for instance, the relationship between the deviation and the mixing ratio of ethanol is preliminary obtained on experiments for preliminarily storage, the fuel-kind determining means 86 can execute the operation based on such a relationship, thereby enabling the mixing ratio of ethanol to be estimated.

When the fuel-alteration determining means 84 makes the positive determination, differential-mechanism switching-condition altering means 88 alters a determining vehicle speed V1 and determining output torque T1 in manners as indicated by arrows $AR_1$ and $AR_2$ shown in FIG. 7. The determining vehicle speed V1 and determining output torque T1, forming a switching condition for determining whether to switch the power distributing mechanism 16, serving as a differential mechanism, to either a non-differential state (locked state) or a differential state (unlocked state). They represent boundary values with which a step-variable control region and a continuously variable control region are demarcated as shown in FIG. 7. The differential-mechanism switching-condition altering means 88 alters the determining vehicle speed V1 and the determining output torque T1 such that the higher the mixing ratio of ethanol estimated with the fuel-kind determining means 86, the lower will be the determining vehicle speed V1 and the determining output torque T1.

From a viewpoint of improving fuel consumption, for example, the step-variable control region has an advantage in which the first electric motor M1 has less power consumption but has a drawback in which the engine 8 hardly operates on the optimum fuel consumption curve. The continuously variable control region has an advantage in which the engine 8 can operate on the optimum fuel consumption curve but has a drawback in which the first electric motor M1 has increased power consumption.

With such advantages and drawbacks in mind, i.e., with a comprehensive standpoint on both of an efficiency of the shifting mechanism 10 and an efficiency of the engine 8 affecting fuel consumption, the determining vehicle speed V1 and determining output torque T1, subjected to the alterations, are determined so as to improve fuel consumption.

The determining vehicle speed V1 and determining output torque T1, needed to be determined for the mixing ratio of ethanol, are preliminarily obtained on experiments to be stored in the differential-mechanism switching-condition altering means 88. The alterations of the determining vehicle speed V1 and determining output torque T1 may be continuously executed or executed step-by-step depending on the mixing ratio of ethanol. In addition, the upshift lines and downshift lines, shown in FIG. 7, may be altered with the alterations of the determining vehicle speed V1 and determining output torque T1.

From a standpoint of preventing the first and second electric motors M1 and M2 from reaching high-speed rotations, preventing the input shaft of the automatic shifting portion 20 from reaching a high-speed rotation and preventing the occurrence of muffled sound or the like, the determining vehicle speed V1 and determining output torque T1 may be varied in ranges limited at certain rates depending on the fuel kind, i.e., the mixing ratio of ethanol.

If the fuel-alteration determining means 84 makes a negative determination, the differential-mechanism switching-condition altering means 88 does not execute the operation to alter the determining vehicle speed V1 and determining output torque T1.

The internal-combustion engine output torque detecting means 82, the fuel-alteration determining means 84, the fuel-kind determining means 86 and the differential-mechanism switching-condition altering means 88 may be executed without regard to the determining operation of the fuel supply determining means 80. However, with a view to reducing a control load of the electronic control device 40, these component parts may be executed only when the fuel supply determining means 80 makes the negative determination.

Figure 11:
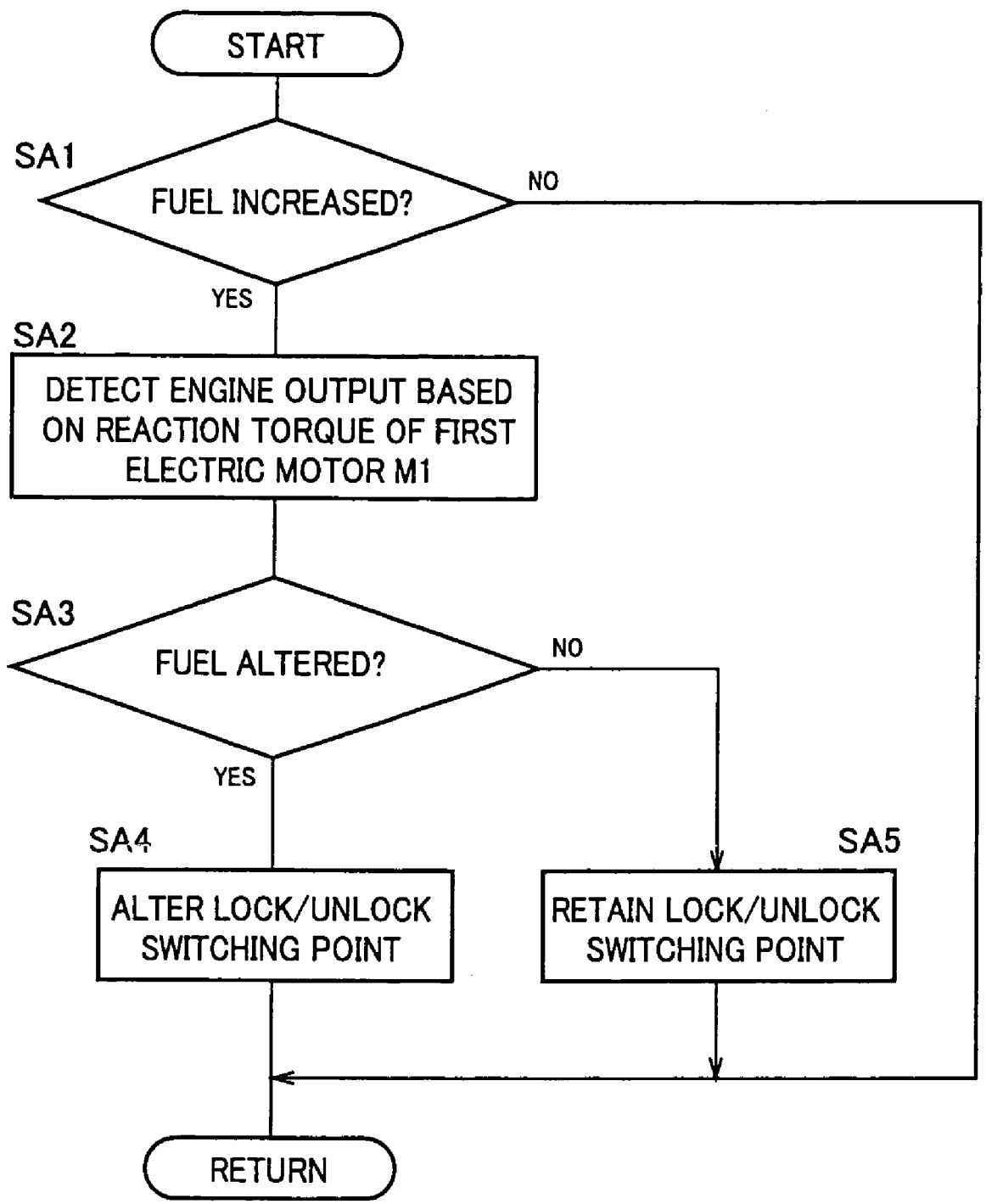
FIG. 11 is a flowchart illustrating a basic sequence of major control operations to be executed with the electronic control device shown in FIG. 4, i.e., a basic sequence of control operations for improving fuel consumption when ethanol is mixed to fuel.

FIG. 11 is a flowchart illustrating a basic sequence of major control operations to be executed by the electronic control device 40, i.e., a basic sequence of control operations for improving fuel consumption when ethanol is mixed to fuel. Such a basic sequence is repeatedly carried out on an extremely short cycle time in the order of, for instance, several milliseconds to several tens milliseconds.

First, in step (hereinafter, the term "step" will be omitted) SA1 corresponding to the fuel supply determining means 80, the operation is executed to determine whether or not fuel increases in the fuel tank 70 of a hybrid vehicle. If a positive determination is made, then, the operation goes to SA2, and if a negative determination is made, then, the control operation in this flowchart is terminated.

More particularly, the presence or the absence of the increase of fuel in the fuel tank 70 is determined in response to a signal delivered from, for instance, the fuel gauge 72 that detects the oil quantity of the fuel tank. In addition, an alternative may be arranged so as to determine the presence of the increase of fuel in the fuel tank 70 in response to the detection on a release of the fueling lid 74 of the fuel tank 70 opened for supply of fuel.

In SA2 corresponding to the internal-combustion engine output torque detecting means 82, first-motor torque $T_{M1}$, representing reactive torque mentioned above, is detected based on a value of an electric current, flowing through the first electric motor M1, which is obtained based on a control variable applied to the inverter 58. Then, engine torque $T_E$ is calculated based on first-motor torque $T_{M1}$ and the gear ratio $\rho 0$ or the like. In particular, when engine torque $T_E$ and first-motor torque $T_{M1}$ are not zeroed and kept in a balanced state, i.e., under the steady running condition, engine torque $T_E$ is calculated using the formula (1) described above.

In SA3 corresponding to the fuel-alteration determining means 84 and the fuel-kind determining means 86, the operation is executed to determine whether or not the relationship between engine torque $T_E$ and the accelerator-opening Acc, calculated in SA2, is deviated from the preliminarily stored baseline characteristic, shown in FIG. 10, beyond the given tolerable range in consideration of a variation in properties of gasoline. If such a deviated relationship is present, then, the determination is made that ethanol is mixed to fuel and the fuel kind is altered.

With such a determination is positive, the mixing ratio of ethanol is estimated based on the relationship between engine torque $T_E$ and the accelerator-opening Acc, calculated in SA2, which is deviated from the baseline characteristic mentioned above. For instance, if the relationship between the deviation of the relationship between actual engine torque $T_E$ and accelerator-opening Acc with respect to the baseline characteristic mentioned above and the mixing ratio of ethanol is preliminarily obtained on experiments for preliminarily storage, the mixing ratio of ethanol can be estimated using such a resultant relationship.

If a positive determination is made in SA 3, then, the operation is executed in SA4 to establish a switching condition for determining which state of the non-differential state (locked state) and the differential state (unlocked state) is to be selected for the power distributing mechanism 16 acting as the differential mechanism. That is, the determining vehicle speed V1 and determining output torque T1, representing the boundary values based on which the step-variable control region and the continuously variable control region, shown in FIG. 7, are demarcated, are altered as shown by the arrows $AR_1$ and $AR_2$ in FIG. 7 such that the higher the mixing ratio of ethanol estimated in SA3, the lower will be the determining vehicle speed V1 and the determining output torque T1. From a viewpoint of improving fuel consumption, the determining vehicle speed V1 and determining output torque T1, subjected to the alterations, are determined so as to improve fuel consumption in consideration of the comprehensive standpoint on the advantages and the drawbacks of the step-variable control region and the continuously variable control region, i.e., in consideration of the comprehensive standpoint on the efficiency of the shifting mechanism 10 affecting fuel consumption and the efficiency of the engine 8 affecting fuel consumption.

The determining vehicle speed V1 and determining output torque T1, determined for the mixing ratio of ethanol, are preliminarily obtained on experiments for storage. From a standpoint of preventing the first and second electric motors M1 and M2 from reaching the high-speed rotations, preventing the input shaft of the automatic shifting portion 20 from reaching the high-speed rotation and preventing the occurrence of muffled sound or the like, the determining vehicle speed V1 and determining output torque T1 have a variable range provided with a given limitation depending on the mixing ratio of ethanol.

If a negative determination is made in SA3, then, none of the determining vehicle speed V1 and determining output torque T1 is altered in SA5. SA4 and SA5 collectively correspond to the differential-mechanism switching-condition altering means 88.

The illustrated embodiment has advantageous effects (A1) to (A11) as listed below.

(A1) The determining vehicle speed V1 and determining output torque T1, representing the boundary values based on which the step-variable control region and the continuously variable control region, shown in FIG. 7 are demarcated, are altered as shown by the arrows $AR_1$ and $AR_2$ in FIG. 7 such that the higher the mixing ratio of ethanol, the lower will be the determining vehicle speed V1 and the determining output torque T1. This allows the determination to be made whether to operate the first electric motor M1 depending on the mixing ratio of ethanol, thereby enabling improved fuel consumption to be obtained depending on the mixing ratio of ethanol.

(A2) From the standpoint of preventing the first and second electric motors M1 and M2 from reaching the high-speed rotations, preventing the input shaft of the automatic shifting portion 20 from reaching the high-speed rotation and preventing the occurrence of muffled sound or the like, the determining vehicle speed V1 and determining output torque T1 have the tolerable range bounded with the given limitation depending on the mixing ratio of ethanol. This prevents the first and second electric motors M1 and M2 and the input shaft of the automatic shifting portion 20 from reaching the high-speed rotations in excess of the given limitation. Thus, no fear of degradations occurs in durability of these component parts, causing no occurrence of muffled sound that impairs a comfort of a vehicle occupant (A3) The shifting mechanism 10 includes the differential portion 11 having the power distributing mechanism 16, composed of the multiple rotary elements RE1 to RE3, whose differential state is controlled with controlling the operating state of the first electric motor M1 connected to the second rotary element RE2. Thus, controlling the operating state of the first electric motor M1 allows the differential state of the power distributing mechanism 16 incorporated in the differential portion 11 to be controlled, enabling the engine 8 to be driven at the rotation speed $N_E$ that can realize the improvement in fuel consumption in line with the optimum fuel consumption curve.

(A4) First-motor torque $T_{M1}$, representing reactive torque acting against engine torque $T_E$, is detected based on the value of electric current, supplied to the first electric motor M1, which is obtained by referring to the control variables applied to the inverter 58. Engine torque $T_E$ is then calculated based on first-motor torque $T_{M1}$ and the gear ratio $\rho 0$ or the like. The mixing ratio of ethanol is estimated based on the deviation of the relationship between calculated engine torque $T_E$ and the accelerator-opening Acc with respect to the baseline characteristic shown in FIG. 10. Thus, detecting first-motor torque $T_{M1}$ enables the mixing ratio of ethanol, corresponding to the fuel kind supplied to the engine 8, to be easily discriminated.

(A5) If the fuel supply determining means 80 makes a positive determination that fuel in the fuel tank 70 increases, then, the functions of the internal-combustion engine output torque detecting means 82, the fuel-alteration determining means 84, the fuel-kind determining means 86 and the differential-mechanism switching-condition altering means 88 are executed. These means are effectuated depending on needs, enabling a reduction in control load of the electronic control device 40.

(A6) With the present embodiment, the fuel supply determining means 80 may be arranged so as to make a positive determination that fuel in the fuel tank 70 increases when the opening of the fueling lid 74 is detected. With such an arrangement, the internal-combustion engine output torque detecting means 82, the fuel-alteration determining means 84, the fuel-kind determining means 86 and the differential-mechanism switching-condition altering means 88 are executed depending on needs, thereby enabling a reduction in control load of the electronic control device 40.

(A7) The shifting mechanism 10 includes the automatic shifting portion 20 that forms part of the power transmitting path extending from the engine 8 to the drive wheels 38. In contrast to a case where the shifting mechanism 10 has no automatic shifting portion 20, a whole of the shifting mechanism 10 can vary the total speed ratio (overall speed ratio) γT in an increased variable range, thereby making it possible to obtain improved fuel consumption.

(A8) Since the automatic shifting portion 20 rendered operative to function as the automatic transmission that automatically varies the speed ratio, the whole of the shifting mechanism 10 can automatically vary the total speed ratio (overall speed ratio) γT, thereby achieving a reduction in load of the driver.

(A9) Since the automatic shifting portion 20 includes the step-variable transmission, the automatic shifting portion 20 can vary the speed ratio in an increased variable range, making it possible to obtain improved fuel consumption.

(A10) The differential portion 11 includes the first and second electric motors M1 and M2 and the differential-portion planetary gear set 24. Therefore, using the differential action of the differential-portion planetary gear set 24 enables the differential portion 11 to be structured such that the differential portion 11 provides infinitely variable output torque.

(A11) The differential portion 11 is rendered operative to serve as the continuously variable transmission upon controlling the operating state of the first electric motor M1. Therefore, the differential portion 11 can output smoothly variable drive torque. In addition, the differential portion 11 is caused to operate as the electrically controlled continuously variable transmission upon continuously varying the speed ratio while operating as the step-variable transmission with varying the speed ratio step-by-step.

Next, another embodiment of the present invention will be described below. In the following description, component parts, common to various embodiments, bear like or corresponding reference numerals to omit redundant description.

Embodiment 2

Figure 12:
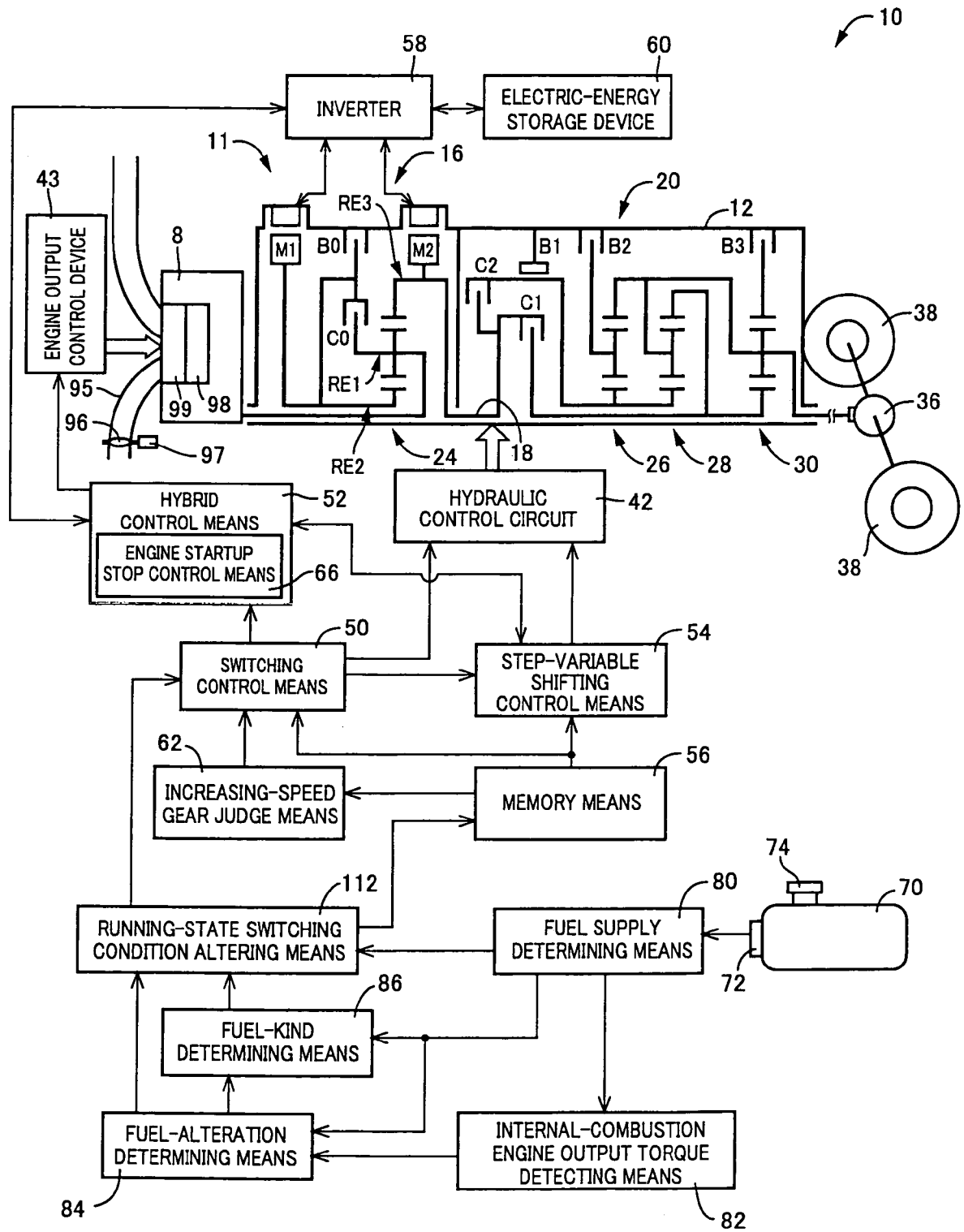
FIG. 12 is a functional block diagram, illustrating a major control function to be executed with the electronic control device shown in FIG. 4, which represents a second embodiment different from the embodiment shown in FIG. 6.

With a second embodiment, an electronic control device 110 is employed in place of the electronic control device 40 of the first embodiment shown in FIG. 4. FIG. 12 is a functional block diagram illustrating a major control function of the electronic control device 110 of the second embodiment. FIG. 12 shows the embodiment corresponding to the structure shown in FIG. 6 with the differential-mechanism switching-condition altering means 88 of the first embodiment being replaced by running-state switching-condition altering means 112. The second embodiment includes the same other means, such as the fuel supply determining means 80, the internal-combustion engine output torque detecting means 82, the fuel-alteration determining means 84 and the fuel-kind determining means 86, as those of the first embodiment. Hereunder, the second embodiment will be described below with a focus on differing points.

In FIG. 12, if the fuel-alteration determining means 84 makes a positive determination, the running-state switching-condition altering means 112 alters a switching condition for determining whether to switch a running state of the vehicle to either the motor drive mode (electric-motor propelled running mode) or the engine drive mode (normal running mode) in the presence of an increase in the mixing ratio of ethanol, estimated with the fuel-kind determining means 86, in a manner described below. That is, a position of the boundary line (solid line A) in FIG. 7 constituting the switching condition, is altered in a manner as indicated by arrows $AR_3$ to $AR_5$ in directions to lower the vehicle speed V and decrease output torque $T_{OUT}$.

Thus, the drive-force-source switching diagram of FIG. 7 is altered such that the higher the mixing ratio of ethanol, the lower will be the output torque and the vehicle speed for the engine-drive region to be initiated. This is because mixing ethanol to gasoline fuel results in a tendency with a high octane rating and as the octane rating increases, knocking is less liable to occur. With a standpoint of such a characteristic, the engine 8 is controlled so as to accelerate the spark timing such that with the vehicle speed kept constant, i.e., with the engine rotation speed $N_E$ kept constant, engine torque $T_E$ increases. In other words, raising engine torque $T_E$ with the engine 8 remaining in a rotating range at a low speed results in improved efficiency of the engine 8.

The boundary line (solid line A) to be determined for the mixing ratio of ethanol is preliminarily obtained on experiments or the like for storage in the running-state switching-condition altering means 112. The alteration on the boundary line (solid line A) may be infinitely carried out depending on the mixing ratio of ethanol or may be conducted step-by-step. From a standpoint of preventing the first and second electric motors M1 and M2 from reaching the high-speed rotations, preventing the input shaft of the automatic shifting portion 20 from reaching the high-speed rotation and preventing the occurrence of muffled sound or the like, the boundary line (solid line A) has a variable range with a certain limitation given thereto depending on the mixing ratio of ethanol.

If the fuel-alteration determining means 84 makes a negative determination, then, the running-state switching-condition altering means 112 does not alter the boundary line (solid line A) shown in FIG. 7.

The internal-combustion-engine output torque detecting means 82, the fuel-alteration determining means 84, the fuel-kind determining means 86 and the running-state switching-condition altering means 112 may be executed regardless of the determining operation of the fuel supply determining means 80. However, with a view to reducing the control load of the electronic control device 110, these component parts may be executed only when the fuel supply determining means 80 makes the negative determination.

Figure 13:
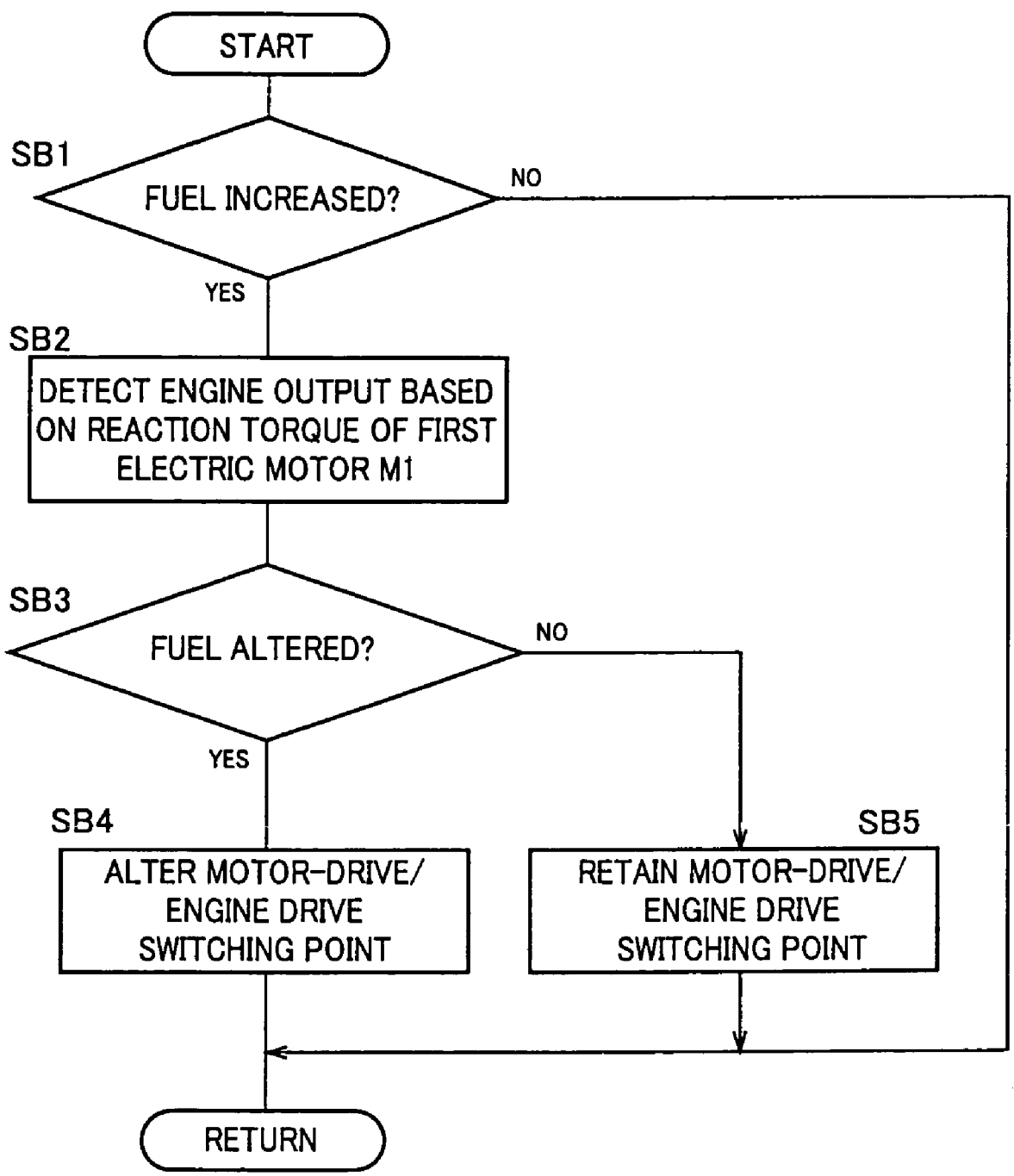
FIG. 13 is a flowchart, illustrating a basic sequence of major control operations to be executed with the electronic control device shown in FIG. 4, i.e., a basic sequence of control operations for improving fuel consumption when ethanol is mixed to fuel, which represents the second embodiment different from the embodiment shown in FIG. 11.

FIG. 13 is a flowchart illustrating a basic sequence of major control operations to be executed by the electronic control device 110, i.e., a basic sequence of control operations for improving fuel consumption when ethanol is mixed to fuel. FIG. 13 represents the embodiment corresponding to that of FIG. 11 and SB1 to SB3 in FIG. 13 represent steps corresponding to SA1 to SA3 of FIG. 11, respectively. In the following, steps in FIG. 13 different from that in FIG. 11 will be mainly explained.

If a determination is made positive in SB3, then, the operation is executed in SB4 to alter the position of the boundary line (solid line A), representing the switching condition for determining which state of the motor-drive mode and the engine-drive mode is to be switched for the vehicle to run, in a manner as indicated by the arrows $AR_3$ to $AR_5$ shown in FIG. 7 such that the higher the mixing ratio of ethanol estimated in SB3, the lower will be the vehicle speed V1 and output torque $T_{OUT}$.

The boundary line (solid line A) to be determined for the mixing ratio of ethanol is preliminarily obtained on experiments or the like for storage. From the standpoint of preventing the first and second electric motors M1 and M2 from reaching the high-speed rotations, preventing the input shaft of the automatic shifting portion 20 from reaching the high-speed rotation and preventing the occurrence of muffled sound or the like, the boundary line (solid line A) has the variable range with the certain limitation given thereto depending on the mixing ratio of ethanol.

If a negative determination is made in SB3, then, no boundary line (solid line A) of FIG. 7 is altered in SB5. Also, SB4 and SB5 correspond to the running-state switching-condition altering means 112.

The second embodiment has the same advantageous effects as those (A3) and (A4) and (A7) to (A11) of the first embodiment and also has additional advantageous effects (B1) to (B4) as listed below.

(B1) The position of the boundary line (solid line A) in FIG. 7, representing the switching condition for determining whether to switch the running condition of the vehicle to either the motor-drive mode or the engine-drive mode, is altered in a manner as indicated by the arrows $AR_3$ to $AR_5$ such that the higher the mixing ratio of ethanol, the lower will be the vehicle speed V and output torque $T_{OUT}$. Therefore, the operation is executed to determine whether to operate the engine 8 depending on the mixing ratio of ethanol, thereby obtaining increased fuel economy performance depending on the mixing ratio of ethanol.

(B2) From the standpoint of preventing the first and second electric motors M1 and M2 from reaching the high-speed rotations, preventing the input shaft of the automatic shifting portion 20 from reaching the high-speed rotation and preventing the occurrence of muffled sound or the like, the boundary line (solid line A) in FIG. 7 has the variable range with the certain limitation given thereto depending on the mixing ratio of ethanol. This prevents the first and second electric motors M1 and M2 and the input shaft of the automatic shifting portion 20 from reaching the high-speed rotations beyond given limits. Thus, no fear of degradation occurs in durability of these component parts, while avoiding the occurrence of muffled sound impairing a comfort of a vehicle occupant.

(B3) If the fuel supply determining means 80 makes a positive determination that fuel in the fuel tank 70 increases, the functions of the internal-combustion engine output torque detecting means 82, the fuel-alteration determining means 84, the fuel-kind determining means 86 and the running-state switching-condition altering means 112 are executed. This results in a reduction in control load of the electronic control device 110.

(B4) In the illustrated embodiment, the fuel supply determining means 80 may be configured so as to operate in response to the operation of detecting the release of the fueling lid 74 to make a positive determination that fuel in the fuel tank 70 increases. With such an alternative structure, the functions of the internal-combustion engine output torque detecting means 82, the fuel-alteration determining means 84, the fuel-kind determining means 86 and the running-state switching-condition altering means 112 are executed depending on needs, thereby enabling a reduction in control load of the electronic control device 110.

Embodiment 3

Figure 14:
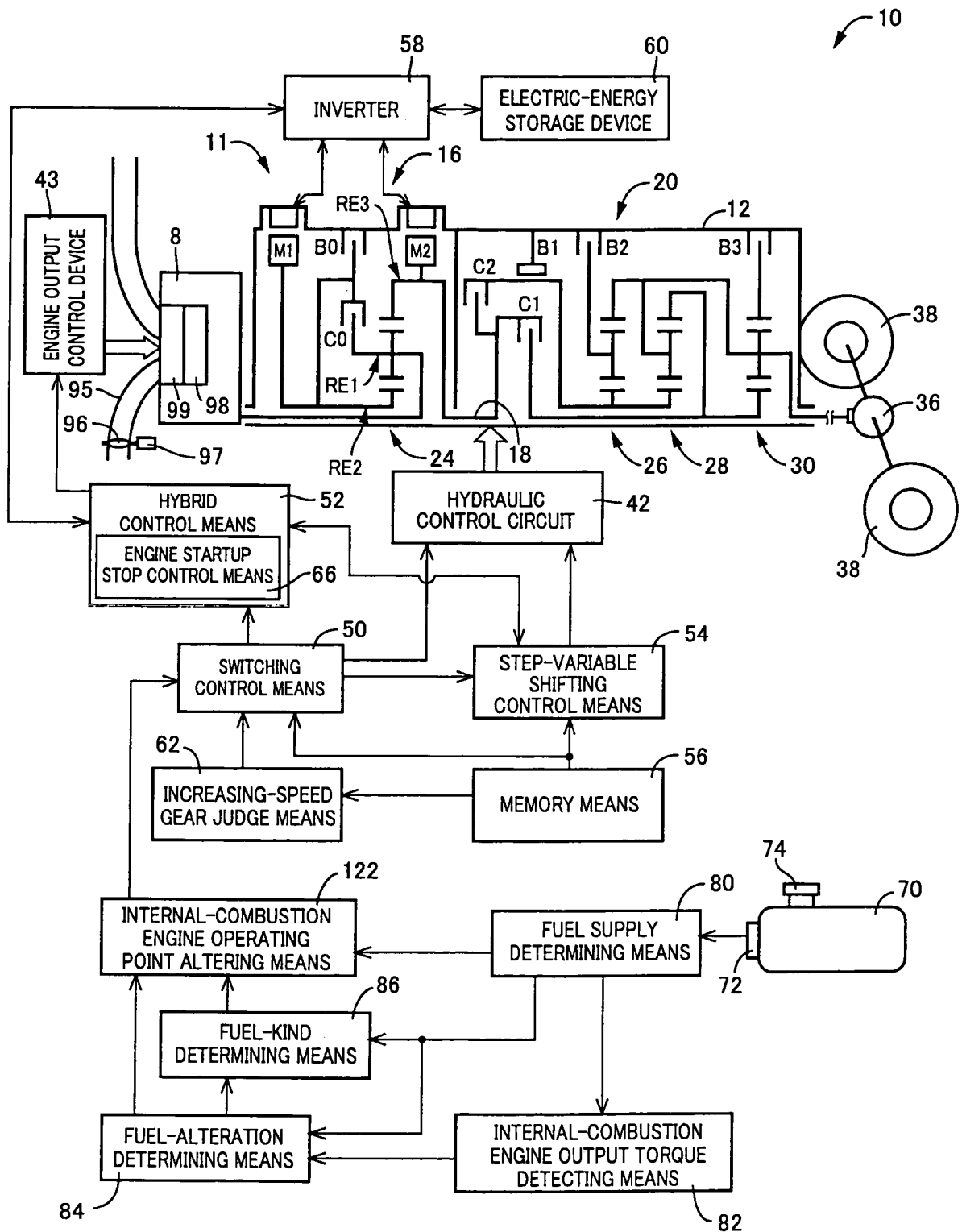
FIG. 14 is a functional block diagram, illustrating a major control function to be executed with the electronic control device shown in FIG. 4, which represents a third embodiment different from the embodiment shown in FIG. 6.

With a third embodiment, an electronic control device 120 is employed in place of the electronic control device 40 of the first embodiment shown in FIG. 4. FIG. 14 is a functional block diagram illustrating a major control function of the electronic control device 120 of the third embodiment. FIG. 14 shows the embodiment corresponding to the structure shown in FIG. 6 with the differential-mechanism switching-condition altering means 88 of the first embodiment being replaced by internal-combustion engine operating point altering means 122. The third embodiment employs the same other means, such as the fuel supply determining means 80, the functions of the internal combustion engine output torque detecting means 82, the fuel-alteration determining means 84 and the fuel-kind determining means 86, as those of the first embodiment. Hereunder, the third embodiment will be described below with a focus on differing points.

When the engine 8 is operating with the differential portion 11 placed in the differential state (unlocked state), the first-motor rotation speed $N_{M1}$ is controlled in a manner described below for improving fuel consumption. That is, the engine 8 operates under an operating condition with an engine operating point tracing the optimum fuel consumption curve, described on the two-dimensional coordinate in terms of the parameters including engine torque $T_E$, determined with the accelerator-opening Acc, and the engine rotation speed $N_E$, in which the rotation speed of the power transmitting member, determined with the vehicle speed V and the gear position of the automatic shifting portion 20 matches the engine rotation speed $N_E$. For instance, the term "optimum fuel consumption curve" refers to a solid line $L_G$ or a broken line $L_{ET}$ described in graphs of FIGS. 15A and 15B.

Figure 15A:
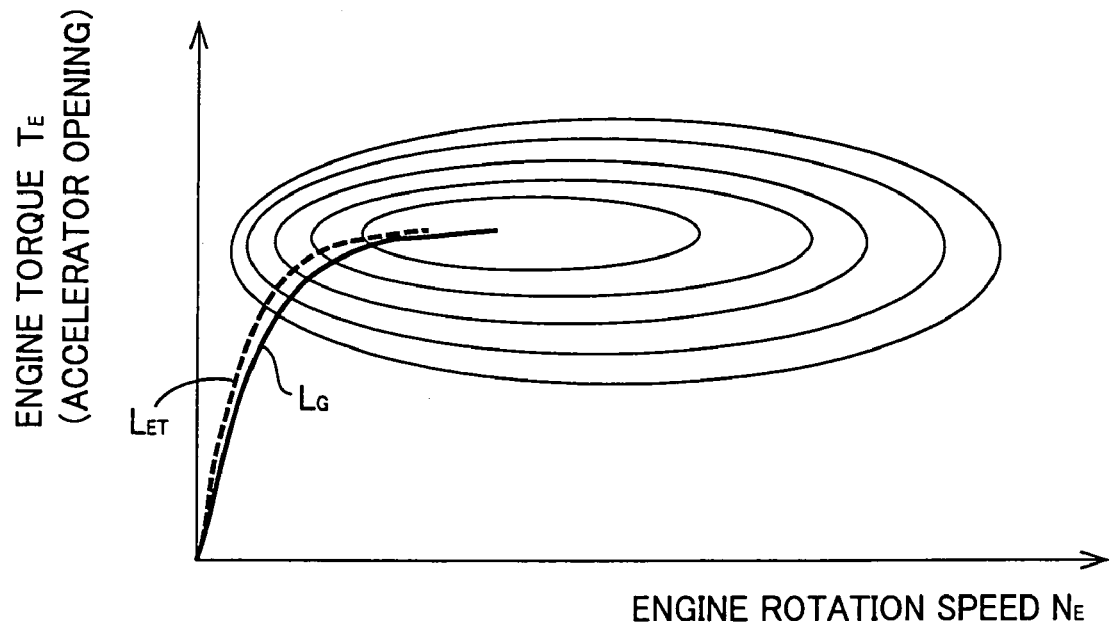
FIGS. 15A and 15B are graphs exemplarily showing optimum fuel consumption curves plotted on orthogonal coordinate systems each with an engine rotation speed and engine torque plotted on respective coordinate axes.
Figure 15B:
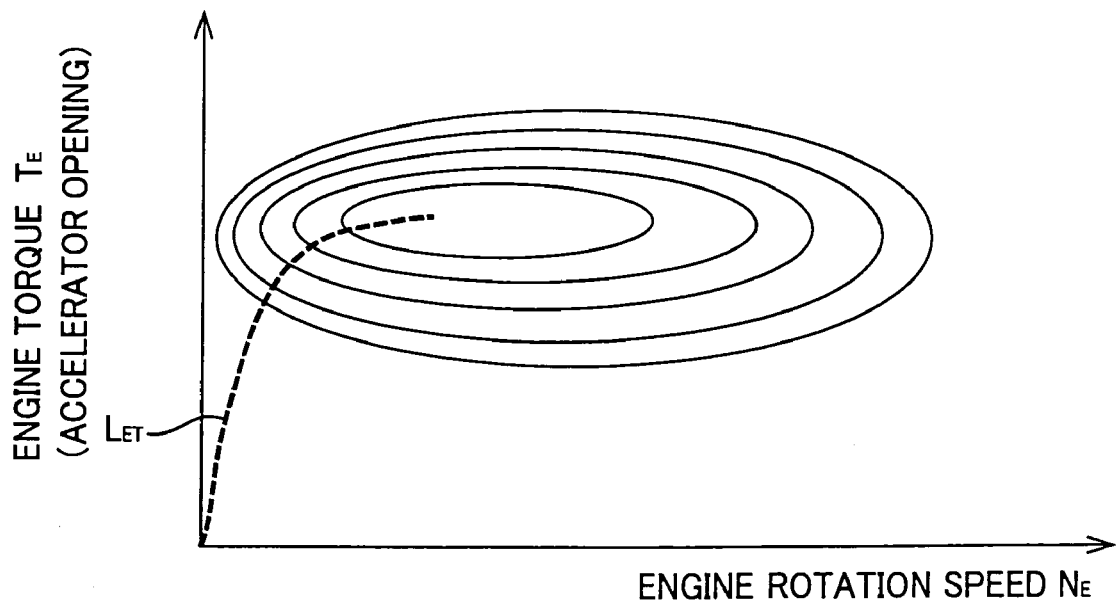

The solid line $L_G$ in FIG. 15A exemplarily shows the optimum fuel consumption curve in case of using fuel composed of only gasoline and the broken line $L_{ET}$ in FIG. 15B exemplarily shows the other optimum fuel consumption curve in case of using gasoline to which a given amount of ethanol is mixed. As will be apparent from FIGS. 15A ad 15B, as ethanol is mixed to gasoline fuel, fuel has a tendency with an increased octane rating with a resultant lessened occurrence of knocking.

With such a tendency in mind, the engine 8 is controlled so as to accelerate the spark timing for improvement of engine efficiency such that the optimum fuel consumption curve is deviated in a direction to lower the engine rotation speed $N_E$. Thus, the optimum fuel consumption curve is altered depending on the fuel kind and, for improving fuel consumption, a need arises to alter the engine operating point depending on the fuel kind.

To this end, the engine operating point is altered when the fuel-alteration determining means 84 shown in FIG. 14 makes a positive determination. That is, the internal-combustion-engine operating point altering means 122 alters the optimum fuel consumption curve in a pattern depending on the mixing ratio of ethanol, estimated with the fuel-kind determining means 86 and alters the engine operating point so as to trace the resulting optimum fuel consumption curve. In addition, the optimum fuel consumption curve and the engine operating point to be determined for the mixing ratio of ethanol are preliminarily obtained on experiments or the like for storage in the internal-combustion engine operating point altering means 122. The alteration of the engine operating point may be infinitely executed or may be executed step-by-step. From the standpoint of preventing the first and second electric motors M1 and M2 from reaching the high-speed rotations, preventing the input shaft of the automatic shifting portion 20 from reaching the high-speed rotation and preventing the occurrence of muffled sound or the like, the engine operating point has a variable range with a certain limitation given thereto depending on the mixing ratio of ethanol.

If the fuel-alteration determining means 84 makes a negative determination, the internal-combustion engine operating point altering means 122 does not operate to alter the engine operating point.

The internal-combustion-engine output torque detecting means 82, the fuel-alteration determining means 84, the fuel-kind determining means 86 and the internal-combustion engine operating point altering means 122 may be executed regardless of the determining operation of the fuel supply determining means 80. However, with a view to reducing a control load of the electronic control device 120, these means may be executed only when the fuel supply determining means 80 makes the positive determination.

FIG. 16 is a flowchart illustrating a basic sequence of major control operations to be executed by the electronic control device 120, i.e., a basic sequence of control operations for improving fuel consumption when ethanol is mixed to fuel. FIG. 16 represents the embodiment corresponding to that of FIG. 11 and SC1 to SC3 in FIG. 16 represent steps corresponding to SA1 to SA3 of FIG. 11, respectively. In the following, steps in FIG. 16 different from that in FIG. 11 will be mainly explained.

If a determination is made positive in SC3, then, the operation is executed in SC4 to alter the optimum fuel consumption curve in a pattern depending on the mixing ratio of ethanol, estimated in SC4, while altering the engine operating point so as to trace the altered optimum fuel consumption curve. The optimum fuel consumption curve and the engine operating point to be determined for the mixing ratio of ethanol are preliminarily obtained on experiments or the like for storage. From the standpoint of preventing the first and second electric motors M1 and M2 from reaching the high-speed rotations, preventing the input shaft of the automatic shifting portion 20 from reaching the high-speed rotation and preventing the occurrence of muffled sound or the like, the engine operating point has the variable range with the certain limitation given thereto depending on the mixing ratio of ethanol.

If a determination is made negative in SC3, then, no engine operating point is altered in SC5. Also, SC4 and SC5 correspond to the internal-combustion-engine operating point altering means 122.

The present embodiment has the same advantageous effects as those (A3) and (A4) and (A7) to (A11) of the first embodiment and also has additional advantageous effects (C1) to (C4) as listed below. (C1) The optimum fuel consumption curve is altered depending on the mixing ratio of ethanol and the engine operating point is altered so as to trace the altered optimum fuel consumption curve. Therefore, the engine 8 is caused to operate on the engine operating point altered depending on the mixing ratio of ethanol, thereby obtaining increased fuel economy performance depending on the mixing ratio of ethanol.

(C2) From the standpoint of preventing the first and second electric motors M1 and M2 from reaching the high-speed rotations, preventing the input shaft of the automatic shifting portion 20 from reaching the high-speed rotation and preventing the occurrence of muffled sound or the like, the engine operating point has the variable range with the certain limitation given thereto depending on the mixing ratio of ethanol. This prevents the first and second electric motors M1 and M2 and the input shaft of the automatic shifting portion 20 from reaching the high-speed rotations beyond given limits. Thus, no fear of degradation occurs in durability of these component parts with no occurrence of muffled sound impairing a comfort of a vehicle occupant (C3) If the fuel supply determining means 80 makes a positive determination that fuel in the fuel tank 70 increases, then, the functions of the internal-combustion engine output torque detecting means 82, the fuel-alteration determining means 84, the fuel-kind determining means 86 and the internal-combustion engine operating point altering means 122 are executed. This results in a reduction in control load of the electronic control device 120.

(C4) In the illustrated embodiment, the fuel supply determining means 80 may be configured to operate in response to the operation of detecting the release of the fueling lid 74 to make a positive determination that fuel in the fuel tank 70 increases. With such an alternative structure, the internal-combustion engine output torque detecting means 82, the fuel-alteration determining means 84, the fuel-kind determining means 86 and the internal-combustion engine operating point altering means 122 are executed depending on needs, thereby enabling a reduction in control load of the electronic control device 120.

While the present invention has been described above with reference to the various embodiments shown in the drawings, it is construed that the embodiments described be considered merely as illustrative of the present invention and that those skilled in the art may practice the present invention in other various modifications and improvements.

For instance, although the first to third embodiments have been described with reference to the cases where ethanol is mixed to gasoline fuel being supplied to the engine 8, fuel may be of the type containing light oil as a principal component or the other type of fuel containing hydrogen. In addition, while the first and second embodiments have been described with reference to the direction in which the switching condition is altered as shown by the arrows $AR_1$ to $AR_5$ and the third embodiment has been described with reference to the direction in which the engine operating point is altered as shown by the solid line $L_G$ and the broken line $L_{ET}$, the directions to be altered will be different from each other depending on the fuel kind.

In the first and the third embodiments, the shifting mechanism 10 is provided with the second electric motor M2. However, since the control operation shown in the flowchart in FIG. 11 for the first embodiment and the flowchart in FIG. 16 for the third embodiment entirely control the first electric motor M1 and the engine 8, the second electric motor M2 is not necessarily provided.

In the second embodiment, the shifting mechanism 10 is provided with the power distributing mechanism 16 and the first electric motor M1. However, so-called parallel hybrid vehicle can be employed, in which the engine 8 is serially connected to the second electric motor M2 via a clutch etc., with no power distributing mechanism 16 and the first electric motor M1 being provided.

In the first to third embodiments, the differential portion 11 (power distributing mechanism 16) has been described above as having the function to operate as the electrically controlled continuously variable transmission with the speed ratio γ0 enabled to continuously vary in the value ranging from the minimum value γ0 min to the maximum value γ0 max. It may suffice for, for instance, the speed ratio γ0 of the differential portion 11 not to be continuously but to be stepwise varied upon daringly utilizing the differential action.

In the first to third embodiments, while the shifting mechanism 10 has been described above with reference to the structure in which the engine 8 and the differential portion 11 are directly connected to each other, it may suffice for the engine 8 to be connected to the differential portion 11 via a clutch engaging element such as a clutch.

In the shifting mechanism 10 of the first to third illustrated embodiments, the first electric motor M1 and the second rotary element RE2 are directly connected to each other, and the second electric motor M2 and the third rotary element RE3 are directly connected to each other. However, the first electric motor M1 and the second rotary element RE2 may be connected to each other via a clutch engaging element such as a clutch or the like, and the second electric motor M2 and the third rotary element RE3 may be connected to each other via a clutch engaging element such as a clutch or the like.

Although the automatic shifting portion 20 in the first to third embodiments is connected to the power transmitting path extending from the engine 8 to the drive wheels 38 at a position next to the differential portion 11, the differential portion 11 may be connected in sequence to the output of the automatic shifting portion 20.

In the first to third embodiments, the differential portion 11 and the automatic shifting portion 20 are serially connected to each other in series in the structure shown FIG. 1. However, the present invention can be applied to a structure even if the differential portion 11 and the automatic shifting portion 20 are mechanically independent from each other, provided that a whole of the shifting mechanism 10 has a function to achieve an electrically controlled differential action enabling a differential state to be electrically varied, and a function to perform a shifting on a principle different from the function of the electrically controlled differential action. While the power distributing mechanism 16, having been described above as of the single planetary type, may be of a doubled-planetary type.

The first to third embodiments have been described above with reference to the structure wherein the engine 8 is connected to the first rotary element RE1 of the differential-portion planetary gear unit 24 for drive-force transmissive state, the first electric motor M2 is connected to the second rotary element RE2 for drive-force transmissive state, and the power transmitting path for the drive wheels 38 is connected to the third rotary element RE3.

However, the present invention may be applied to such a structure including, for instance, two planetary gear units wherein partial rotary elements, forming such planetary gear units, are connected to each other. With such a structure, an engine, an electric motor and drive wheels are connected to the rotary elements of the planetary gear units for drive-force transmitting capability such that a clutch or a brake, connected to the rotary elements of the planetary gear units, can be controlled to switch a shifting mode between the step-variable shifting mode and the continuously variable shifting mode.

While the automatic shifting portion 20, having been described above as having a function to serve as the step-variable automatic transmission in the first to third embodiments, may include a continuously variable CVT or a shifting portion that functions as a manually operated transmission.

The second electric motor M2, having been described above with reference to the structure directly connected to the power transmitting member 18 in the first to third embodiments. The connecting position of the second electric motor M2 is not limited this mode. That is, the second electric motor M2 may be connected to the power transmitting path extended from the engine 8 or the transmitting member 18 to the drive wheel 38, directly or indirectly via the transmission, the planetary gear unit or the engaging element, etc.

In the power distributing mechanism 16 of the power first to third embodiments, the differential portion carrier CA0 is connected to the engine 8, the differential portion sun gear S0 is connected to the first electric motor M1, and the differential portion ring gear R0 is connected to the transmitting member 18. The connecting relation of these elements is not limited to this mode. That is, the engine 8, the first electric motor M1 and the transmitting member 18 can be freely connected to any of three elements CA0, S0 and R0 of the differential-portion planetary gear unit 24, respectively.

The engine 8, directly connected to the input shaft 14 in the first to third embodiments, may be operatively connected to the input shaft 14 via the gear, belt and the like for instance. The engine 8 and the input shaft 14 are not necessarily disposed coaxially.

In the first to third embodiments, with the first electric motor M1 and the second electric motor M2 being disposed coaxially with the input shaft 14, the first electric motor M1 is connected to the differential portion sun gear S0 and the second electric motor M2 is connected to the transmitting member 18. Such arrangement is not essential. For instance, the first electric motor M1 and the second electric motor M2 are operatively connected respectively to the differential portion sun gear S0 and the transmitting member 18, via the gears, belts, speed reducer and the like.

In the first to third embodiments, the automatic shifting portion 20 is serially connected to the differential portion 11 via the transmitting member 18. However, the automatic shifting portion 20 may be disposed coaxially with a counter shaft provided to be parallel to the input shaft 14. In this case, the differential portion 11 and the automatic shifting portion 20 are connected in the drive-power transmissive state via a paired counter gears, or a pair of transmitting members including a sprocket and a chain, as the transmitting member 18.

In the first to third embodiments, the power distributing mechanism 16 is comprised of the paired differential-portion planetary gear units 24. However, it may be constructed by the two or more planetary gear units which function as the transmission having the three or more shifting stages in the non-differential state (fixed speed state).

Finally, the first to third embodiments can be carried out in combination under the predetermined priority.

What is claimed is:

1. A control device for a vehicular power transmitting apparatus, wherein the vehicular power transmitting apparatus comprises (i) an electrically controlled differential portion including a differential mechanism, composed of a plurality of rotary elements, whose differential state is controlled upon controlling an operating state of a differential-action controlling electric motor connected to one of the plurality of rotary elements in a power transmissive state, and (ii) a differential-state switching device configured to selectively switch the differential mechanism into a non-differential state for disenabling a rotation of a certain rotary element among the plurality of rotary elements or causing a whole of the plurality of rotary elements to move in a unitary rotation and a differential state for permitting the plurality of rotary elements to rotate relative to each other to initiate a differential action; and the control device is configured to alter a differential-mechanism switching condition for determining whether to switch the differential mechanism to the non-differential state or the differential state depending on a kind of fuel used in an internal-combustion engine connected to the vehicular power transmitting apparatus in the power transmissive state, wherein the differential-state switching device switches the differential mechanism to the non-differential state, using an engagement of a mechanical coupling device, by disenabling the rotation of the certain rotary element among the plurality of rotary elements or causing the whole of the plurality of rotary elements to move in the unitary rotation.

2. The control device for a vehicular power transmitting apparatus according to claim 1, wherein the differential-mechanism switching condition or the running-state switching condition is established for each kind of fuel so as to prevent component elements of a vehicle from reaching high-speed rotations beyond given rotation speeds.

3. The control device for a vehicular power transmitting apparatus according to claim 1, wherein the control device allows internal-combustion engine output torque, output from the internal-combustion engine, to be detected based on reactive torque of the differential-action controlling electric motor acting against the internal-combustion engine output torque for determining the kind of fuel based on the internal-combustion engine output torque.

4. The control device for a vehicular power transmitting apparatus according to claim 3, wherein the control device determines the kind of fuel when an amount of fuel in a fuel tank mounted on a vehicle increases.

5. The control device for a vehicular power transmitting apparatus according to claim 3, wherein the control device determines the kind of fuel when detecting a release of a lid for closing a fueling port of a fuel tank mounted on a vehicle.

6. The control device for a vehicular power transmitting apparatus according to claim 1, wherein the vehicular power transmitting apparatus comprises a shifting portion forming part of a power transmitting path extending from the internal-combustion engine to drive wheels.

7. The control device for a vehicular power transmitting apparatus according to claim 6, wherein the shifting portion functions as an automatic transmission that automatically varies a speed ratio.

8. The control device for a vehicular power transmitting apparatus according to claim 6, wherein the shifting portion comprises a step-variable transmission.

9. The control device for a vehicular power transmitting apparatus according to claim 1, wherein the electrically controlled differential portion comprises at least two electric motors and a planetary gear unit.

10. The control device for a vehicular power transmitting apparatus according to claim 1, wherein the electrically controlled differential portion operates as a continuously variable transmission by controlling an operating state of the differential-action controlling electric motor.

11. The control device for a vehicular power transmitting apparatus according to claim 1, wherein the control device includes fuel-alteration determining means for determining alteration of the fuel, fuel-kind determining means for determining the kind of fuel, and differential-mechanism switching-condition altering means for altering the differential-mechanism switching condition.

12. The control device for a vehicular power transmitting apparatus according to claim 11, wherein the fuel-alteration determining means determines alteration of the fuel depending on torque of the internal-combustion engine and an accelerator opening.

13. The control device for a vehicular power transmitting apparatus according to claim 12, wherein the fuel-kind determining means determines a mixing ratio of a special component in the fuel, depending on a deviation in an amount of relation between the torque of the internal-combustion engine and the accelerator opening, from a baseline characteristic.

14. The control device for a vehicular power transmitting apparatus according to claim 13, wherein the differential-mechanism switching-condition altering means alters the differential-mechanism switching condition depending on vehicle speed and output torque determined, based on the mixing ratio of the special component in the fuel.

15. A control device for a vehicular power transmitting apparatus wherein
the vehicular power transmitting apparatus comprises at least one running-drive motor connected to or connectable to drive wheels in a power transmissive state and is configured to allow a running state of a vehicle to be selectively switched into a motor-drive mode, in which only the running-drive motor is used as a drive-force source to cause the vehicle to run with an internal-combustion engine placed in a halted state, and a normal running mode in which the vehicle is caused to run with the internal-combustion engine placed in an operating state; and
the control device is configured to alter a running-state switching condition for determining whether to switch the running state of the vehicle to the motor-drive mode or the normal running mode depending on a kind of fuel used in the internal-combustion engine,
wherein a boundary line between a motor-drive mode region for executing the motor-drive mode and a normal running mode region for executing the normal running mode is altered depending on the kind of fuel used in the internal-combustion engine.

16. The control device for a vehicular power transmitting apparatus according to claim 15, wherein the vehicular power transmitting apparatus comprises an electrically controlled differential portion including a differential mechanism, composed of a plurality of rotary elements, whose differential state is controlled with the control device controlling an operating state of a differential-action controlling electric motor connected to one of the plurality of rotary elements in the power transmissive state.

17. The control device for a vehicular power transmitting apparatus according to claim 16, wherein the control device allows internal-combustion engine output torque, output from the internal-combustion engine, to be detected based on reactive torque of the differential-action controlling electric motor acting against the internal-combustion engine output torque for discriminating the kind of fuel based on the internal-combustion engine output torque.

18. The control device for a vehicular power transmitting apparatus according to claim 16, wherein the electrically controlled differential portion comprises more than two electric motors and a planetary gear unit.

19. The control device for a vehicular power transmitting apparatus according to claim 16, wherein the electrically controlled differential portion operates as a continuously variable transmission by controlling an operating state of the differential-action controlling electric motor.

20. The control device for a vehicular power transmitting apparatus according to claim 15, wherein the control device includes fuel-alteration determining means for determining alteration of the fuel, fuel-kind determining means for determining the kind of fuel, and running-state switching-condition altering means for altering the running-state switching condition.

21. The control device for a vehicular power transmitting apparatus according to claim 20, wherein the running-state switching-condition altering means alters at least one of vehicle speed and output torque depending on an amount of a specific component in the fuel.

22. The control device for a vehicular power transmitting apparatus according to claim 15, wherein the differential-mechanism switching condition or the running-state switching condition is established for each kind of fuel so as to prevent component elements of the vehicle from reaching high-speed rotations beyond given rotation speeds.

23. The control device for a vehicular power transmitting apparatus according to claim 15, wherein the vehicular power transmitting apparatus comprises a shifting portion forming part of a power transmitting path extending from the internal-combustion engine to drive wheels.

* * * * *